US010747952B2

(12) United States Patent
Aymeloglu et al.

(10) Patent No.: US 10,747,952 B2
(45) Date of Patent: Aug. 18, 2020

(54) AUTOMATIC CREATION AND SERVER PUSH OF MULTIPLE DISTINCT DRAFTS

(75) Inventors: Andrew Aymeloglu, Palo Alto, CA (US); Nicholas Miyake, Palo Alto, CA (US); Brandon Burr, Palo Alto, CA (US); Derek Cicerone, Palo Alto, CA (US); Kevin Simler, Palo Alto, CA (US); Garry Tan, San Francisco, CA (US)

(73) Assignee: PALANTIR TECHNOLOGIES, INC., Palo Alto, CA (US)

( * ) Notice: Subject to any disclaimer, the term of this patent is extended or adjusted under 35 U.S.C. 154(b) by 468 days.

(21) Appl. No.: 12/556,321

(22) Filed: Sep. 9, 2009

(65) Prior Publication Data

US 2010/0070844 A1 Mar. 18, 2010

Related U.S. Application Data

(60) Provisional application No. 61/097,059, filed on Sep. 15, 2008, provisional application No. 61/122,695, filed on Dec. 15, 2008.

(51) Int. Cl.
*G06F 40/197* (2020.01)
*G06F 40/166* (2020.01)
(Continued)

(52) U.S. Cl.
CPC .......... *G06F 40/197* (2020.01); *G06F 3/0482* (2013.01); *G06F 3/0484* (2013.01); *G06F 40/166* (2020.01); *G06F 40/279* (2020.01)

(58) Field of Classification Search
USPC ........................................................ 715/229
See application file for complete search history.

(56) References Cited

U.S. PATENT DOCUMENTS 4,881,179 A 11/1989 Vincent
5,109,399 A 4/1992 Thompson
(Continued)

FOREIGN PATENT DOCUMENTS

AU 2013251186 11/2015
CA 2828264 4/2014
(Continued)

OTHER PUBLICATIONS

AskDrexel Drexel University Knowledge Base; "How to: Auto save a document before printing in Word 2007"; Published Nov. 13, 2007 02:59 PM; 2 pages; https://askdrexel.drexel.edu/app/answers/detail/a_id/2353/~/how-to%3A-auto-save-a-document-before-printing-in-word-2007.*

(Continued)

*Primary Examiner* — Scott T Baderman
*Assistant Examiner* — Benjamin Smith
(74) *Attorney, Agent, or Firm* — Hickman Palermo Becker Bingham LLP

(57) ABSTRACT

An application automatically saves drafts of a document in association with the document. Drafts are saved, for example, whenever the application closes the document. Thus, the application stores a separate draft of the document for each session in which the document was used. The saved drafts are logically associated with each other and their original document. Because of this association, whenever the user accesses the document in the application, the application may present to the user a list of the various drafts of the documents. The user may continue working on the last saved draft, or the user may select another draft from which to continue working. The application further includes a collaborative interface for listing objects at a server. The server pushes new changes or additions to the objects
(Continued)

directly to the client, and the client updates the interface accordingly, without user intervention.

30 Claims, 8 Drawing Sheets

(51) Int. Cl.
  *G06F 3/0482* (2013.01)
  *G06F 3/0484* (2013.01)
  *G06F 40/279* (2020.01)

(56) References Cited

U.S. PATENT DOCUMENTS

| | | | |
|---|---|---|---|
| 5,241,625 A | | 8/1993 | Epard et al. |
| 5,329,108 A | | 7/1994 | Lamoure |
| 5,412,769 A | | 5/1995 | Maruoka et al. |
| 5,414,838 A | | 5/1995 | Kolton et al. |
| 5,418,950 A | | 5/1995 | Li et al. |
| 5,428,737 A | | 6/1995 | Li et al. |
| 5,428,776 A | | 6/1995 | Rothfield |
| 5,444,819 A | | 8/1995 | Negishi |
| 5,454,104 A | | 9/1995 | Steidlmayer et al. |
| 5,542,089 A | | 7/1996 | Lindsay et al. |
| 5,568,390 A | | 10/1996 | Hirota et al. |
| 5,608,899 A | | 3/1997 | Li et al. |
| 5,613,105 A | | 3/1997 | Xbikowski et al. |
| 5,632,009 A | | 5/1997 | Rao et al. |
| 5,670,987 A | | 9/1997 | Doi et al. |
| 5,701,456 A | | 12/1997 | Jacopi et al. |
| 5,724,575 A | | 3/1998 | Hoover et al. |
| 5,781,704 A | | 7/1998 | Rossmo |
| 5,794,228 A | | 8/1998 | French et al. |
| 5,794,229 A | | 8/1998 | French et al. |
| 5,798,769 A | | 8/1998 | Chiu et al. |
| 5,819,226 A | | 10/1998 | Gopinathan et al. |
| 5,819,238 A | | 10/1998 | Fernholz |
| 5,826,021 A | | 10/1998 | Mastors et al. |
| 5,832,218 A | | 11/1998 | Gibbs et al. |
| 5,845,300 A | | 12/1998 | Comer |
| 5,845,530 A | | 12/1998 | Brockmeyer et al. |
| 5,857,329 A | | 1/1999 | Bingham |
| 5,872,973 A | | 2/1999 | Mitchell et al. |
| 5,878,434 A | | 3/1999 | Draper et al. |
| 5,892,900 A | | 4/1999 | Ginter et al. |
| 5,897,636 A | | 4/1999 | Kaeser |
| 5,902,349 A | | 5/1999 | Endo et al. |
| 5,911,138 A | | 6/1999 | Li et al. |
| 5,918,225 A | | 6/1999 | White et al. |
| 5,966,706 A | | 10/1999 | Biliris et al. |
| 5,999,911 A | | 12/1999 | Berg et al. |
| 6,006,242 A | | 12/1999 | Poole et al. |
| 6,012,042 A | | 1/2000 | Black et al. |
| 6,057,757 A | | 5/2000 | Arrowsmith et al. |
| 6,065,026 A | * | 5/2000 | Cornelia et al. ............... 715/202 |
| 6,072,942 A | | 6/2000 | Stockwell et al. |
| 6,091,956 A | | 7/2000 | Hollenberg |
| 6,094,643 A | | 7/2000 | Anderson et al. |
| 6,101,479 A | | 8/2000 | Shaw |
| 6,104,401 A | | 8/2000 | Parsons |
| 6,134,582 A | | 10/2000 | Kennedy |
| 6,161,098 A | | 12/2000 | Wallman |
| 6,189,005 B1 | | 2/2001 | Chakrabarti et al. |
| 6,208,985 B1 | | 3/2001 | Krehel |
| 6,219,053 B1 | | 4/2001 | Tachibana et al. |
| 6,232,971 B1 | | 5/2001 | Haynes |
| 6,236,994 B1 | | 5/2001 | Swartz et al. |
| 6,237,138 B1 | | 5/2001 | Hameluck et al. |
| 6,243,706 B1 | | 6/2001 | Morbeau et al. |
| 6,243,717 B1 | | 6/2001 | Gordon et al. |
| 6,247,019 B1 | | 6/2001 | Davies |
| 6,279,018 B1 | | 8/2001 | Kudrolli et al. |
| 6,289,334 B1 | | 9/2001 | Reiner et al. |
| 6,289,338 B1 | | 9/2001 | Stoffel et al. |
| 6,311,181 B1 | | 10/2001 | Lee et al. |
| 6,313,833 B1 | | 11/2001 | Knight |
| 6,321,274 B1 | | 11/2001 | Shakib et al. |
| 6,341,310 B1 | | 1/2002 | Leshem et al. |
| 6,349,315 B1 | | 2/2002 | Sonoyama et al. |
| 6,366,933 B1 | | 4/2002 | Ball et al. |
| 6,369,835 B1 | | 4/2002 | Lin |
| 6,370,538 B1 | | 4/2002 | Lamping et al. |
| 6,430,305 B1 | | 8/2002 | Decker |
| 6,456,997 B1 | | 9/2002 | Shukla |
| 6,463,404 B1 | | 10/2002 | Appleby |
| 6,496,774 B1 | | 12/2002 | Davies |
| 6,496,817 B1 | | 12/2002 | Whang et al. |
| 6,513,019 B2 | | 1/2003 | Lewis |
| 6,519,627 B1 | | 2/2003 | Dan et al. |
| 6,523,019 B1 | | 2/2003 | Borthwick |
| 6,532,449 B1 | | 3/2003 | Goertzel et al. |
| 6,549,944 B1 | | 4/2003 | Weinberg et al. |
| 6,560,620 B1 | | 5/2003 | Ching |
| 6,581,068 B1 | | 6/2003 | Bensoussan et al. |
| 6,594,672 B1 | | 7/2003 | Lampson et al. |
| 6,608,559 B1 | | 8/2003 | Lemelson et al. |
| 6,631,496 B1 | | 10/2003 | Li et al. |
| 6,640,231 B1 | | 10/2003 | Andersen et al. |
| 6,642,945 B1 | | 11/2003 | Sharpe |
| 6,643,613 B2 | | 11/2003 | McGee et al. |
| 6,662,202 B1 | | 12/2003 | Krusche et al. |
| 6,665,683 B1 | | 12/2003 | Meltzer |
| 6,674,434 B1 | | 1/2004 | Chojnacki et al. |
| 6,714,936 B1 | | 3/2004 | Nevin, III |
| 6,745,382 B1 | | 6/2004 | Zothner |
| 6,748,481 B1 | | 6/2004 | Parry et al. |
| 6,775,675 B1 | | 8/2004 | Nwabueze et al. |
| 6,801,201 B2 | | 10/2004 | Escher |
| 6,820,135 B1 | | 11/2004 | Dingman |
| 6,828,920 B2 | | 12/2004 | Owen et al. |
| 6,839,745 B1 | | 1/2005 | Dingari et al. |
| 6,850,317 B2 | | 2/2005 | Mullins et al. |
| 6,851,108 B1 | | 2/2005 | Syme et al. |
| 6,857,120 B1 | | 2/2005 | Arnold et al. |
| 6,876,981 B1 | | 4/2005 | Berckmans |
| 6,877,137 B1 | | 4/2005 | Rivette et al. |
| 6,907,426 B2 | | 6/2005 | Hellerstein et al. |
| 6,920,453 B2 | | 7/2005 | Mannila et al. |
| 6,944,777 B1 | | 9/2005 | Belani et al. |
| 6,944,821 B1 | | 9/2005 | Bates et al. |
| 6,967,589 B1 | | 11/2005 | Peters |
| 6,976,024 B1 | | 12/2005 | Chavez et al. |
| 6,976,210 B1 | | 12/2005 | Silva et al. |
| 6,978,419 B1 | | 12/2005 | Kantrowitz |
| 6,980,984 B1 | | 12/2005 | Huffman et al. |
| 6,985,950 B1 | | 1/2006 | Hanson et al. |
| 7,028,223 B1 | | 4/2006 | Kolawa et al. |
| 7,036,085 B2 | | 4/2006 | Barros |
| 7,043,449 B1 | | 5/2006 | Li et al. |
| 7,043,702 B2 | | 5/2006 | Chi et al. |
| 7,055,110 B2 | | 5/2006 | Kupka et al. |
| 7,058,648 B1 | | 6/2006 | Lightfoot et al. |
| 7,085,890 B2 | | 8/2006 | Kashyap |
| 7,086,028 B1 | * | 8/2006 | Davis et al. ................... 716/102 |
| 7,089,541 B2 | | 8/2006 | Ungar |
| 7,111,231 B1 | | 9/2006 | Huck et al. |
| 7,124,357 B1 | * | 10/2006 | Orr ....................... G06F 40/166 715/234 |
| 7,133,409 B1 | | 11/2006 | Willardson |
| 7,139,800 B2 | | 11/2006 | Bellotti et al. |
| 7,155,728 B1 | | 12/2006 | Prabhu et al. |
| 7,158,878 B2 | | 1/2007 | Rasmussen et al. |
| 7,162,475 B2 | | 1/2007 | Ackerman |
| 7,168,039 B2 | | 1/2007 | Bertram |
| 7,171,427 B2 | | 1/2007 | Witowski et al. |
| 7,174,377 B2 | | 2/2007 | Bernard et al. |
| 7,181,423 B2 | | 2/2007 | Blanchard et al. |
| 7,185,065 B1 | | 2/2007 | Holtzman et al. |
| 7,194,680 B1 | | 3/2007 | Roy et al. |
| 7,213,030 B1 | * | 5/2007 | Jenkins |
| 7,216,133 B2 | | 5/2007 | Wu et al. |
| 7,216,299 B2 | | 5/2007 | Knight |
| 7,237,192 B1 | | 6/2007 | Stephenson et al. |
| 7,240,330 B2 | | 7/2007 | Fairweather |

(56) References Cited

U.S. PATENT DOCUMENTS

| | | |
|---|---|---|
| 7,246,090 B1 | 7/2007 | Thomas |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,356,504 B2 | 4/2008 | Muller |
| 7,370,047 B2 | 5/2008 | Gorman |
| 7,379,811 B2 | 5/2008 | Rasmussen et al. |
| 7,379,903 B2 | 5/2008 | Caballero et al. |
| 7,392,254 B1 * | 6/2008 | Jenkins |
| 7,401,038 B2 | 7/2008 | Masuda |
| 7,403,921 B2 | 7/2008 | Tanpoco et al. |
| 7,403,922 B1 | 7/2008 | Lewis et al. |
| 7,403,942 B1 | 7/2008 | Bayliss |
| 7,406,592 B1 | 7/2008 | Polyudov |
| 7,409,357 B2 | 8/2008 | Schaf et al. |
| 7,426,654 B2 | 9/2008 | Adams et al. |
| 7,437,728 B2 | 10/2008 | Stackhouse et al. |
| 7,441,182 B2 * | 10/2008 | Beilinson et al. ............ 715/229 |
| 7,441,219 B2 | 10/2008 | Perry et al. |
| 7,454,466 B2 | 11/2008 | Bellotti et al. |
| 7,461,158 B2 | 12/2008 | Rider et al. |
| 7,467,375 B2 | 12/2008 | Tondreau et al. |
| 7,469,238 B2 | 12/2008 | Satchwell |
| 7,487,139 B2 | 2/2009 | Fraleigh et al. |
| 7,502,786 B2 | 3/2009 | Liu et al. |
| 7,519,589 B2 | 4/2009 | Charnock et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,533,069 B2 | 5/2009 | Fairweather |
| 7,542,934 B2 | 6/2009 | Markel |
| 7,546,245 B2 | 6/2009 | Surpin et al. |
| 7,546,353 B2 | 6/2009 | Hesselink et al. |
| 7,558,677 B2 | 7/2009 | Jones |
| 7,568,157 B1 * | 7/2009 | Orr ......................... G09B 7/02 |
| | | 434/322 |
| 7,574,409 B2 | 8/2009 | Patinkin |
| 7,574,428 B2 | 8/2009 | Leiserowitz et al. |
| 7,579,965 B2 | 8/2009 | Bucholz |
| 7,587,352 B2 | 9/2009 | Arnott |
| 7,590,582 B2 | 9/2009 | Dunne |
| 7,596,285 B2 | 9/2009 | Brown et al. |
| 7,603,229 B2 | 10/2009 | Goldberg et al. |
| 7,610,290 B2 | 10/2009 | Kruy et al. |
| 7,614,006 B2 | 11/2009 | Molander |
| 7,617,232 B2 | 11/2009 | Gabbert et al. |
| 7,620,582 B2 | 11/2009 | Masuda |
| 7,620,628 B2 | 11/2009 | Kapur et al. |
| 7,627,489 B2 | 12/2009 | Schaeffer et al. |
| 7,627,812 B2 | 12/2009 | Chamberlain et al. |
| 7,630,931 B1 | 12/2009 | Rachev et al. |
| 7,634,717 B2 | 12/2009 | Chamberlain et al. |
| 7,640,173 B2 | 12/2009 | Surpin et al. |
| 7,657,478 B2 | 2/2010 | De Diego |
| 7,685,042 B1 | 3/2010 | Monroe et al. |
| 7,685,083 B2 | 3/2010 | Fairweather |
| 7,703,021 B1 | 4/2010 | Flam |
| 7,706,817 B2 | 4/2010 | Bamrah et al. |
| 7,712,049 B2 | 5/2010 | Williams et al. |
| 7,716,067 B2 | 5/2010 | Surpin et al. |
| 7,716,077 B1 | 5/2010 | Mikurak |
| 7,716,140 B1 | 5/2010 | Nielsen et al. |
| 7,716,227 B1 | 5/2010 | Hao et al. |
| 7,725,530 B2 | 5/2010 | Sah et al. |
| 7,725,547 B2 | 5/2010 | Albertson et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,756,843 B1 | 7/2010 | Palmer |
| 7,757,220 B2 | 7/2010 | Griffith et al. |
| 7,765,489 B1 | 7/2010 | Shah |
| 7,770,100 B2 | 8/2010 | Chamberlain et al. |
| 7,783,679 B2 | 8/2010 | Bley |
| 7,805,457 B1 | 9/2010 | Viola et al. |
| 7,809,703 B2 | 10/2010 | Balabhadrapatruni et al. |
| 7,818,291 B2 | 10/2010 | Ferguson et al. |
| 7,818,658 B2 | 10/2010 | Chen |
| 7,835,966 B2 | 11/2010 | Satchwell |
| 7,848,995 B2 | 12/2010 | Dalal |
| 7,853,573 B2 | 12/2010 | Warner et al. |
| 7,870,493 B2 | 1/2011 | Pall et al. |
| 7,877,421 B2 | 1/2011 | Berger et al. |
| 7,880,921 B2 | 2/2011 | Dattilo et al. |
| 7,894,984 B2 | 2/2011 | Rasmussen et al. |
| 7,899,611 B2 | 3/2011 | Downs et al. |
| 7,904,913 B2 | 3/2011 | Sim-Tang et al. |
| 7,908,521 B2 | 3/2011 | Sridharan et al. |
| 7,912,842 B1 | 3/2011 | Bayliss |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,941,336 B1 | 5/2011 | Robin-Jan |
| 7,958,147 B1 * | 6/2011 | Turner .................. G06F 21/604 |
| | | 707/694 |
| 7,962,281 B2 | 6/2011 | Rasmussen et al. |
| 7,962,495 B2 | 6/2011 | Jain et al. |
| 7,962,848 B2 | 6/2011 | Bertram |
| 7,966,199 B1 | 6/2011 | Frasher |
| 7,970,240 B1 | 6/2011 | Chao et al. |
| 7,971,150 B2 | 6/2011 | Raskutti et al. |
| 7,979,424 B2 | 7/2011 | Dettinger et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,507 B2 * | 8/2011 | Poston et al. .................. 707/687 |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,041,714 B2 | 10/2011 | Aymeloglu et al. |
| 8,042,110 B1 | 10/2011 | Kawahara et al. |
| 8,046,283 B2 | 10/2011 | Burns |
| 8,054,756 B2 | 11/2011 | Chand et al. |
| 8,060,421 B1 | 11/2011 | Wang |
| 8,065,606 B1 * | 11/2011 | Gralnick ............. G06F 17/2205 |
| | | 715/200 |
| 8,073,857 B2 | 12/2011 | Sreekanth |
| 8,082,172 B2 | 12/2011 | Chao et al. |
| 8,103,543 B1 | 1/2012 | Zwicky |
| 8,103,962 B2 | 1/2012 | Embley et al. |
| 8,108,138 B2 | 1/2012 | Bruce et al. |
| 8,112,425 B2 | 2/2012 | Baum et al. |
| 8,117,022 B2 | 2/2012 | Linker |
| 8,126,848 B2 | 2/2012 | Wagner |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,191,005 B2 | 5/2012 | Baier et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,326,727 B2 | 12/2012 | Aymeloglu et al. |
| 8,352,174 B2 | 1/2013 | Milstein et al. |
| 8,352,881 B2 | 1/2013 | Champion et al. |
| 8,364,642 B1 | 1/2013 | Garrod |
| 8,368,695 B2 | 2/2013 | Howell et al. |
| 8,392,556 B2 | 3/2013 | Goulet et al. |

(56) References Cited

U.S. PATENT DOCUMENTS

| | | |
|---|---|---|
| 8,397,171 B2 | 3/2013 | Klassen et al. |
| 8,412,707 B1 | 4/2013 | Mianji |
| 8,417,409 B2 | 4/2013 | Bast et al. |
| 8,417,715 B1 | 4/2013 | Bruckhaus et al. |
| 8,429,194 B2 | 4/2013 | Aymeloglu et al. |
| 8,429,527 B1 | 4/2013 | Arbogast |
| 8,433,702 B1 | 4/2013 | Carrino et al. |
| 8,433,703 B1 | 4/2013 | Schneider et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,484,549 B2 | 7/2013 | Burr et al. |
| 8,489,331 B2 | 7/2013 | Kopf et al. |
| 8,489,641 B1 | 7/2013 | Seefeld et al. |
| 8,494,941 B2 | 7/2013 | Aymeloglu et al. |
| 8,498,984 B1 | 7/2013 | Hwang et al. |
| 8,499,287 B2 | 7/2013 | Shafi et al. |
| 8,510,743 B2 | 8/2013 | Hackborn et al. |
| 8,514,082 B2 | 8/2013 | Cova et al. |
| 8,515,207 B2 | 8/2013 | Chau |
| 8,527,949 B1 | 9/2013 | Pleis et al. |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,554,719 B2 | 10/2013 | McGrew |
| 8,560,413 B1 | 10/2013 | Quarterman |
| 8,560,494 B1 | 10/2013 | Downing |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,600,872 B1 | 12/2013 | Yan |
| 8,601,326 B1 | 12/2013 | Kirn |
| 8,620,641 B2 | 12/2013 | Farnsworth et al. |
| 8,639,552 B1 | 1/2014 | Chen et al. |
| 8,639,757 B1 | 1/2014 | Zang et al. |
| 8,645,332 B1 | 2/2014 | Cohen et al. |
| 8,646,080 B2 | 2/2014 | Williamson et al. |
| 8,666,861 B2 | 3/2014 | Li et al. |
| 8,676,857 B1 | 3/2014 | Adams et al. |
| 8,682,696 B1 | 3/2014 | Shanmugam |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,763,078 B1 | 6/2014 | Castellucci et al. |
| 8,781,169 B2 | 7/2014 | Jackson et al. |
| 8,786,605 B1 | 7/2014 | Curtis et al. |
| 8,787,939 B2 | 7/2014 | Papakipos et al. |
| 8,788,407 B1 | 7/2014 | Singh et al. |
| 8,798,354 B1 | 8/2014 | Bunzel et al. |
| 8,799,313 B2 | 8/2014 | Satlow |
| 8,799,799 B2 | 8/2014 | Cervelli et al. |
| 8,799,867 B1 | 8/2014 | Peri-Glass et al. |
| 8,807,948 B2 | 8/2014 | Luo et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,903,717 B2 | 12/2014 | Elliot |
| 8,909,597 B2 | 12/2014 | Aymeloglu et al. |
| 8,909,656 B2 | 12/2014 | Kumar et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,429 B1 | 12/2014 | Fisher et al. |
| 8,924,872 B1 | 12/2014 | Bogomolov et al. |
| 8,930,874 B2 | 1/2015 | Duff et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 8,949,164 B1 | 2/2015 | Mohler |
| 8,984,390 B2 | 3/2015 | Aymeloglu et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,031,981 B1 | 5/2015 | Potter et al. |
| 9,032,531 B1 | 5/2015 | Scorvo et al. |
| 9,043,696 B1 | 5/2015 | Meiklejohn et al. |
| 9,043,894 B1 | 5/2015 | Dennison et al. |
| 9,058,315 B2 | 6/2015 | Burr et al. |
| 9,092,482 B2 | 7/2015 | Harris et al. |
| 9,100,428 B1 | 8/2015 | Visbal |
| 9,105,000 B1 | 8/2015 | White et al. |
| 9,116,975 B2 | 8/2015 | Shankar et al. |
| 9,129,219 B1 | 9/2015 | Robertson et al. |
| 9,165,100 B2 | 10/2015 | Begur et al. |
| 9,229,966 B2 | 1/2016 | Aymeloglu et al. |
| 9,280,532 B2 | 3/2016 | Cicerone |
| 9,286,373 B2 | 3/2016 | Elliot et al. |
| 9,292,388 B2 | 3/2016 | Fisher et al. |
| 9,330,120 B2 | 5/2016 | Colgrove et al. |
| 9,348,677 B2 | 5/2016 | Marinelli, III et al. |
| 9,348,880 B1 | 5/2016 | Kramer et al. |
| 9,367,463 B2 | 6/2016 | Biswal et al. |
| 9,378,524 B2 | 6/2016 | Aymeloglu et al. |
| 9,449,074 B1 | 9/2016 | Fisher et al. |
| 9,852,205 B2 | 12/2017 | Tamayo |
| 9,880,987 B2 | 1/2018 | Burr et al. |
| 9,898,335 B1 | 2/2018 | Marinelli, III |
| 2001/0011243 A1 | 8/2001 | Dembo et al. |
| 2001/0021936 A1 | 9/2001 | Bertram |
| 2001/0027424 A1 | 10/2001 | Torigoe |
| 2002/0007329 A1 | 1/2002 | Alcaly et al. |
| 2002/0007331 A1 | 1/2002 | Lo et al. |
| 2002/0026404 A1 | 2/2002 | Thompson |
| 2002/0030701 A1 | 3/2002 | Knight |
| 2002/0032677 A1 | 3/2002 | Morgenthaler et al. |
| 2002/0033848 A1 | 3/2002 | Sciammarella et al. |
| 2002/0035590 A1 | 3/2002 | Eibach et al. |
| 2002/0040336 A1 | 4/2002 | Blanchard et al. |
| 2002/0059126 A1 | 5/2002 | Ricciardi |
| 2002/0065708 A1 | 5/2002 | Senay et al. |
| 2002/0087570 A1 | 7/2002 | Jacquez et al. |
| 2002/0091707 A1 | 7/2002 | Keller |
| 2002/0095360 A1 | 7/2002 | Joao |
| 2002/0095658 A1 | 7/2002 | Shulman |
| 2002/0099870 A1 | 7/2002 | Miller et al. |
| 2002/0103705 A1 | 8/2002 | Brady |
| 2002/0107886 A1* | 8/2002 | Gentner .............. G06F 40/166 715/255 |
| 2002/0116120 A1 | 8/2002 | Ruiz et al. |
| 2002/0130907 A1 | 9/2002 | Chi et al. |
| 2002/0138383 A1 | 9/2002 | Rhee |
| 2002/0147671 A1 | 10/2002 | Sloan et al. |
| 2002/0156812 A1 | 10/2002 | Krasnoiarov et al. |
| 2002/0174201 A1 | 11/2002 | Ramer et al. |
| 2002/0184111 A1 | 12/2002 | Swanson |
| 2002/0194119 A1 | 12/2002 | Wright et al. |
| 2002/0196229 A1 | 12/2002 | Chen et al. |
| 2003/0004770 A1 | 1/2003 | Miller et al. |
| 2003/0009392 A1 | 1/2003 | Perkowski |
| 2003/0009399 A1 | 1/2003 | Boerner |
| 2003/0023620 A1 | 1/2003 | Trotta |
| 2003/0028560 A1 | 2/2003 | Kudrolli et al. |
| 2003/0036927 A1 | 2/2003 | Bowen |
| 2003/0039948 A1 | 2/2003 | Donahue |
| 2003/0061132 A1 | 3/2003 | Mason et al. |
| 2003/0065605 A1 | 4/2003 | Gatto |
| 2003/0065606 A1 | 4/2003 | Satchwell |
| 2003/0065607 A1 | 4/2003 | Satchwell |
| 2003/0078827 A1 | 4/2003 | Hoffman |
| 2003/0093401 A1 | 5/2003 | Czahkowski et al. |
| 2003/0093755 A1 | 5/2003 | O'Carroll |
| 2003/0105759 A1 | 6/2003 | Bess et al. |
| 2003/0105833 A1 | 6/2003 | Daniels |
| 2003/0115481 A1 | 6/2003 | Baird et al. |

(56) References Cited

U.S. PATENT DOCUMENTS

| | | |
|---|---|---|
| 2003/0126102 A1 | 7/2003 | Borthwick |
| 2003/0130996 A1 | 7/2003 | Bayerl et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0167423 A1 | 9/2003 | Murakami et al. |
| 2003/0172021 A1 | 9/2003 | Huang |
| 2003/0172053 A1 | 9/2003 | Fairweather |
| 2003/0177112 A1 | 9/2003 | Gardner |
| 2003/0182177 A1 | 9/2003 | Gallagher |
| 2003/0182313 A1 | 9/2003 | Federwisch et al. |
| 2003/0184588 A1 | 10/2003 | Lee |
| 2003/0187761 A1 | 10/2003 | Olsen et al. |
| 2003/0200217 A1 | 10/2003 | Ackerman |
| 2003/0212670 A1 | 11/2003 | Yalamanchi et al. |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0003009 A1 | 1/2004 | Wilmot |
| 2004/0006523 A1 | 1/2004 | Coker |
| 2004/0032432 A1 | 2/2004 | Baynger |
| 2004/0034570 A1 | 2/2004 | Davis |
| 2004/0044648 A1 | 3/2004 | Anfindsen et al. |
| 2004/0064256 A1 | 4/2004 | Barinek et al. |
| 2004/0078451 A1 | 4/2004 | Dietz et al. |
| 2004/0083466 A1 | 4/2004 | Dapp et al. |
| 2004/0085318 A1 | 5/2004 | Hassler et al. |
| 2004/0088177 A1 | 5/2004 | Travis et al. |
| 2004/0095349 A1 | 5/2004 | Bito et al. |
| 2004/0098731 A1 | 5/2004 | Demsey et al. |
| 2004/0103088 A1 | 5/2004 | Cragun et al. |
| 2004/0103124 A1 | 5/2004 | Kupkova |
| 2004/0111410 A1 | 6/2004 | Burgoon et al. |
| 2004/0111480 A1 | 6/2004 | Yue |
| 2004/0117387 A1 | 6/2004 | Civetta et al. |
| 2004/0126840 A1 | 7/2004 | Cheng et al. |
| 2004/0133500 A1 | 7/2004 | Thompson et al. |
| 2004/0139212 A1 | 7/2004 | Mukherjee et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0153451 A1 | 8/2004 | Phillips et al. |
| 2004/0153837 A1 | 8/2004 | Preston et al. |
| 2004/0163039 A1 | 8/2004 | Gorman |
| 2004/0181554 A1 | 9/2004 | Heckerman et al. |
| 2004/0193599 A1 | 9/2004 | Liu et al. |
| 2004/0193600 A1 | 9/2004 | Kaasten et al. |
| 2004/0193608 A1 | 9/2004 | Gollapudi et al. |
| 2004/0205492 A1 | 10/2004 | Newsome |
| 2004/0205644 A1* | 10/2004 | Shaughnessy ......... G06F 17/24 715/255 |
| 2004/0210763 A1 | 10/2004 | Jonas |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0254658 A1 | 12/2004 | Sherriff et al. |
| 2004/0260702 A1 | 12/2004 | Cragun et al. |
| 2004/0267746 A1 | 12/2004 | Marcjan et al. |
| 2005/0004911 A1 | 1/2005 | Goldberg et al. |
| 2005/0010472 A1 | 1/2005 | Quatse et al. |
| 2005/0021397 A1 | 1/2005 | Cui et al. |
| 2005/0021877 A1 | 1/2005 | Varpela et al. |
| 2005/0027632 A1 | 2/2005 | Zeitoun et al. |
| 2005/0027705 A1 | 2/2005 | Sadri et al. |
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0060712 A1 | 3/2005 | Miller et al. |
| 2005/0060713 A1 | 3/2005 | Miller et al. |
| 2005/0065811 A1 | 3/2005 | Chu et al. |
| 2005/0075962 A1 | 4/2005 | Dunne |
| 2005/0075966 A1 | 4/2005 | Duka |
| 2005/0080769 A1 | 4/2005 | Gemmell |
| 2005/0086207 A1 | 4/2005 | Heuer et al. |
| 2005/0090911 A1 | 4/2005 | Ingargiola et al. |
| 2005/0091186 A1 | 4/2005 | Elish |
| 2005/0097441 A1 | 5/2005 | Herbach et al. |
| 2005/0108001 A1 | 5/2005 | Aarskog |
| 2005/0120080 A1 | 6/2005 | Weinreb et al. |
| 2005/0125715 A1 | 6/2005 | Di Franco et al. |
| 2005/0131935 A1 | 6/2005 | O'Leary et al. |
| 2005/0133588 A1 | 6/2005 | Williams |
| 2005/0149455 A1 | 7/2005 | Bruesewitz et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0171881 A1 | 8/2005 | Ghassemieh et al. |
| 2005/0180330 A1 | 8/2005 | Shapiro |
| 2005/0182709 A1 | 8/2005 | Belcsak et al. |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0226473 A1 | 10/2005 | Ramesh |
| 2005/0246327 A1 | 11/2005 | Yeung et al. |
| 2005/0251786 A1 | 11/2005 | Citron et al. |
| 2005/0256703 A1 | 11/2005 | Markel |
| 2005/0262004 A1 | 11/2005 | Sakata et al. |
| 2005/0262057 A1 | 11/2005 | Lesh et al. |
| 2005/0262493 A1 | 11/2005 | Schmidt et al. |
| 2005/0262512 A1 | 11/2005 | Schmidt et al. |
| 2005/0278286 A1 | 12/2005 | Djugash et al. |
| 2006/0004740 A1 | 1/2006 | Dettinger et al. |
| 2006/0010130 A1 | 1/2006 | Leff et al. |
| 2006/0020398 A1 | 1/2006 | Vernon et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0047590 A1 | 3/2006 | Anderson et al. |
| 2006/0052984 A1 | 3/2006 | Nakadate et al. |
| 2006/0053097 A1* | 3/2006 | King ................. G06F 17/241 |
| 2006/0053170 A1 | 3/2006 | Hill et al. |
| 2006/0059072 A1 | 3/2006 | Boglaev |
| 2006/0059139 A1 | 3/2006 | Robinson |
| 2006/0059423 A1 | 3/2006 | Lehmann et al. |
| 2006/0064181 A1 | 3/2006 | Kato |
| 2006/0070046 A1 | 3/2006 | Balakrishnan et al. |
| 2006/0074730 A1 | 4/2006 | Shukla et al. |
| 2006/0074866 A1 | 4/2006 | Chamberlain et al. |
| 2006/0074881 A1 | 4/2006 | Vembu et al. |
| 2006/0074967 A1 | 4/2006 | Shaburov |
| 2006/0080139 A1 | 4/2006 | Mainzer |
| 2006/0080316 A1 | 4/2006 | Gilmore et al. |
| 2006/0080616 A1 | 4/2006 | Vogel et al. |
| 2006/0080619 A1 | 4/2006 | Carlson et al. |
| 2006/0093223 A1 | 5/2006 | Saffer et al. |
| 2006/0116943 A1 | 6/2006 | Willain |
| 2006/0116991 A1 | 6/2006 | Calderwood |
| 2006/0129746 A1 | 6/2006 | Porter |
| 2006/0129992 A1 | 6/2006 | Oberholtzer et al. |
| 2006/0136513 A1* | 6/2006 | Ngo ................. G06F 17/2288 |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0155654 A1 | 7/2006 | Plessis et al. |
| 2006/0178915 A1 | 8/2006 | Chao |
| 2006/0203337 A1 | 9/2006 | White |
| 2006/0209085 A1 | 9/2006 | Wong et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0218637 A1 | 9/2006 | Thomas et al. |
| 2006/0224356 A1 | 10/2006 | Castelli et al. |
| 2006/0235786 A1 | 10/2006 | DiSalvo |
| 2006/0241856 A1 | 10/2006 | Cobleigh et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0253502 A1 | 11/2006 | Raman et al. |

(56) References Cited

U.S. PATENT DOCUMENTS

| | | |
|---|---|---|
| 2006/0259524 A1* | 11/2006 | Horton ............... G06F 17/2288 |
| 2006/0265311 A1 | 11/2006 | Dean et al. |
| 2006/0265397 A1 | 11/2006 | Bryan et al. |
| 2006/0265417 A1 | 11/2006 | Amato et al. |
| 2006/0271277 A1 | 11/2006 | Hu et al. |
| 2006/0271838 A1 | 11/2006 | Carro |
| 2006/0271884 A1 | 11/2006 | Hurst |
| 2006/0277460 A1 | 12/2006 | Forstall et al. |
| 2006/0279630 A1 | 12/2006 | Aggarwal et al. |
| 2006/0288046 A1 | 12/2006 | Gupta et al. |
| 2007/0000999 A1 | 1/2007 | Kubo et al. |
| 2007/0005582 A1 | 1/2007 | Navratil et al. |
| 2007/0011150 A1 | 1/2007 | Frank |
| 2007/0011304 A1 | 1/2007 | Error |
| 2007/0016363 A1 | 1/2007 | Huang et al. |
| 2007/0018986 A1 | 1/2007 | Hauser |
| 2007/0027851 A1 | 2/2007 | Kruy et al. |
| 2007/0038646 A1 | 2/2007 | Thota |
| 2007/0038962 A1 | 2/2007 | Thota |
| 2007/0043686 A1* | 2/2007 | Teng et al. .................. 707/1 |
| 2007/0055598 A1 | 2/2007 | Fuchs et al. |
| 2007/0055599 A1 | 3/2007 | Arnott et al. |
| 2007/0057966 A1 | 3/2007 | Arnott |
| 2007/0061259 A1 | 3/2007 | Ohno et al. |
| 2007/0061752 A1 | 3/2007 | Zoldi et al. |
| 2007/0067233 A1 | 3/2007 | Cory |
| 2007/0067285 A1 | 3/2007 | Dalal |
| 2007/0078832 A1 | 3/2007 | Blume |
| 2007/0083541 A1 | 4/2007 | Ott et al. |
| 2007/0088596 A1 | 4/2007 | Fraleigh et al. |
| 2007/0091868 A1 | 4/2007 | Berkelhamer et al. |
| 2007/0094248 A1 | 4/2007 | Hollman et al. |
| 2007/0094312 A1 | 4/2007 | McVeigh et al. |
| 2007/0094389 A1 | 4/2007 | Nussey et al. |
| 2007/0106582 A1 | 5/2007 | Baker et al. |
| 2007/0112714 A1 | 5/2007 | Fairweather |
| 2007/0113164 A1 | 5/2007 | Hansen et al. |
| 2007/0118527 A1 | 5/2007 | Winje et al. |
| 2007/0136095 A1 | 6/2007 | Weinstein |
| 2007/0136115 A1 | 6/2007 | Doganaksoy et al. |
| 2007/0150369 A1 | 6/2007 | Zivin |
| 2007/0150801 A1 | 6/2007 | Chidlovskii et al. |
| 2007/0150805 A1 | 6/2007 | Misovski |
| 2007/0156673 A1 | 7/2007 | Maga |
| 2007/0168269 A1 | 7/2007 | Chuo |
| 2007/0168270 A1 | 7/2007 | De Diego Arozamena et al. |
| 2007/0168336 A1 | 7/2007 | Ransil et al. |
| 2007/0168871 A1* | 7/2007 | Jenkins ...................... 715/751 |
| 2007/0174760 A1 | 7/2007 | Chamberlain et al. |
| 2007/0178501 A1 | 7/2007 | Chamberlain et al. |
| 2007/0185850 A1 | 8/2007 | Walters et al. |
| 2007/0185867 A1 | 8/2007 | Maga |
| 2007/0192265 A1 | 8/2007 | Chopin et al. |
| 2007/0192281 A1 | 8/2007 | Cradick et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0219882 A1 | 9/2007 | May |
| 2007/0220604 A1 | 9/2007 | Long |
| 2007/0226617 A1 | 9/2007 | Traub et al. |
| 2007/0233709 A1 | 10/2007 | Abnous |
| 2007/0233756 A1 | 10/2007 | D'Souza et al. |
| 2007/0239606 A1 | 10/2007 | Eisen |
| 2007/0240062 A1 | 10/2007 | Christena et al. |
| 2007/0245339 A1 | 10/2007 | Bauman et al. |
| 2007/0260582 A1 | 11/2007 | Liang |
| 2007/0266336 A1 | 11/2007 | Nojima et al. |
| 2007/0271317 A1 | 11/2007 | Carmel |
| 2007/0282951 A1 | 12/2007 | Selimis et al. |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0005063 A1 | 1/2008 | Seeds |
| 2008/0010440 A1 | 1/2008 | Altman et al. |
| 2008/0015920 A1 | 1/2008 | Fawls et al. |
| 2008/0016155 A1 | 1/2008 | Khalatian |
| 2008/0016216 A1 | 1/2008 | Worley et al. |
| 2008/0040250 A1 | 2/2008 | Salter |
| 2008/0040684 A1 | 2/2008 | Crump |
| 2008/0046481 A1 | 2/2008 | Gould et al. |
| 2008/0046803 A1 | 2/2008 | Beauchamp et al. |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0091693 A1* | 4/2008 | Murthy ...................... 707/100 |
| 2008/0097816 A1 | 4/2008 | Freire et al. |
| 2008/0103798 A1 | 5/2008 | Domenikos et al. |
| 2008/0103996 A1 | 5/2008 | Forman et al. |
| 2008/0104019 A1 | 5/2008 | Nath |
| 2008/0104407 A1 | 5/2008 | Horne et al. |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0133310 A1 | 6/2008 | Kim et al. |
| 2008/0140387 A1 | 6/2008 | Linker |
| 2008/0140576 A1 | 6/2008 | Lewis et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0172607 A1* | 7/2008 | Baer ........................... 715/255 |
| 2008/0177782 A1* | 7/2008 | Poston .................. G06F 40/197 |
| 2008/0177994 A1* | 7/2008 | Mayer .................. G06F 9/4418 |
| | | 713/2 |
| 2008/0183639 A1 | 7/2008 | DiSalvo |
| 2008/0186904 A1 | 8/2008 | Koyama et al. |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0196016 A1 | 8/2008 | Todd |
| 2008/0201313 A1 | 8/2008 | Dettinger et al. |
| 2008/0208820 A1 | 8/2008 | Usey et al. |
| 2008/0215543 A1 | 9/2008 | Huang et al. |
| 2008/0215546 A1 | 9/2008 | Baum et al. |
| 2008/0222295 A1 | 9/2008 | Robinson et al. |
| 2008/0228467 A1 | 9/2008 | Womack et al. |
| 2008/0243711 A1 | 10/2008 | Aymeloglu et al. |
| 2008/0243799 A1 | 10/2008 | Rozich et al. |
| 2008/0249820 A1 | 10/2008 | Pathria |
| 2008/0249845 A1 | 10/2008 | Aronowich et al. |
| 2008/0249957 A1 | 10/2008 | Masuyama et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0267386 A1 | 10/2008 | Cooper |
| 2008/0270316 A1 | 10/2008 | Guidotti et al. |
| 2008/0276167 A1 | 11/2008 | Michael |
| 2008/0278311 A1 | 11/2008 | Grange et al. |
| 2008/0281580 A1 | 11/2008 | Zabokritski |
| 2008/0288306 A1 | 11/2008 | MacIntyre et al. |
| 2008/0288471 A1 | 11/2008 | Wu et al. |
| 2008/0288475 A1 | 11/2008 | Kim et al. |
| 2008/0301042 A1 | 12/2008 | Patzer |
| 2008/0301559 A1 | 12/2008 | Martinsen et al. |
| 2008/0301643 A1 | 12/2008 | Appleton et al. |
| 2008/0313132 A1 | 12/2008 | Hao et al. |
| 2008/0313243 A1* | 12/2008 | Poston et al. ................. 707/203 |
| 2008/0313281 A1 | 12/2008 | Scheidl et al. |
| 2009/0002492 A1 | 1/2009 | Velipasalar et al. |
| 2009/0006150 A1 | 1/2009 | Prigge et al. |
| 2009/0006271 A1 | 1/2009 | Crowder |
| 2009/0007056 A1 | 1/2009 | Prigge et al. |
| 2009/0018996 A1 | 1/2009 | Hunt et al. |
| 2009/0024962 A1 | 1/2009 | Gotz |
| 2009/0027418 A1 | 1/2009 | Maru et al. |
| 2009/0030915 A1 | 1/2009 | Winter et al. |
| 2009/0031401 A1* | 1/2009 | Cudich et al. .................... 726/4 |
| 2009/0037912 A1 | 2/2009 | Stoitsev et al. |
| 2009/0043762 A1 | 2/2009 | Shiverick et al. |
| 2009/0043801 A1 | 2/2009 | LeClair |
| 2009/0055251 A1 | 2/2009 | Shah et al. |

(56) References Cited

U.S. PATENT DOCUMENTS

| | | |
|---|---|---|
| 2009/0055487 A1 | 2/2009 | Moraes et al. |
| 2009/0076845 A1 | 3/2009 | Bellin et al. |
| 2009/0083275 A1 | 3/2009 | Jacob et al. |
| 2009/0088964 A1 | 4/2009 | Schaaf et al. |
| 2009/0089651 A1 | 4/2009 | Herberger et al. |
| 2009/0094166 A1 | 4/2009 | Aymeloglu et al. |
| 2009/0094217 A1 | 4/2009 | Dettinger et al. |
| 2009/0106178 A1 | 4/2009 | Chu |
| 2009/0106242 A1 | 4/2009 | McGrew |
| 2009/0106305 A1* | 4/2009 | Murakami .......... G06F 17/2288 |
| 2009/0106308 A1 | 4/2009 | Killian et al. |
| 2009/0112678 A1* | 4/2009 | Luzardo .............................. 705/8 |
| 2009/0112745 A1 | 4/2009 | Stefanescu |
| 2009/0112922 A1 | 4/2009 | Barinaga |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0138307 A1 | 5/2009 | Belcsak et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0144747 A1 | 6/2009 | Baker |
| 2009/0150868 A1* | 6/2009 | Chakra ............... G06F 11/3692 717/125 |
| 2009/0161147 A1 | 6/2009 | Klave |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172674 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0187556 A1 | 7/2009 | Ross et al. |
| 2009/0193012 A1 | 7/2009 | Williams |
| 2009/0193050 A1 | 7/2009 | Olson |
| 2009/0199047 A1 | 8/2009 | Vaitheeswaran et al. |
| 2009/0199106 A1 | 8/2009 | Jonsson et al. |
| 2009/0216562 A1 | 8/2009 | Faulkner et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0228365 A1 | 9/2009 | Tomchek et al. |
| 2009/0228507 A1 | 9/2009 | Jain et al. |
| 2009/0234720 A1 | 9/2009 | George et al. |
| 2009/0248721 A1 | 10/2009 | Burton et al. |
| 2009/0248757 A1* | 10/2009 | Havewala ........... G06F 17/3023 |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0299830 A1 | 12/2009 | West et al. |
| 2009/0307049 A1 | 12/2009 | Elliott et al. |
| 2009/0313250 A1 | 12/2009 | Folting et al. |
| 2009/0313311 A1 | 12/2009 | Hoffmann et al. |
| 2009/0313463 A1 | 12/2009 | Pang et al. |
| 2009/0319418 A1 | 12/2009 | Herz |
| 2009/0319891 A1 | 12/2009 | MacKinlay |
| 2009/0319996 A1 | 12/2009 | Shafi et al. |
| 2009/0327157 A1 | 12/2009 | Dunne |
| 2010/0004857 A1 | 1/2010 | Pereira et al. |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057600 A1 | 3/2010 | Johansen et al. |
| 2010/0057622 A1 | 3/2010 | Faith et al. |
| 2010/0057716 A1 | 3/2010 | Stefik et al. |
| 2010/0070426 A1 | 3/2010 | Aymeloglu et al. |
| 2010/0070427 A1 | 3/2010 | Aymeloglu et al. |
| 2010/0070464 A1 | 3/2010 | Aymeloglu et al. |
| 2010/0070489 A1 | 3/2010 | Aymeloglu et al. |
| 2010/0070523 A1 | 3/2010 | Delgo et al. |
| 2010/0070531 A1 | 3/2010 | Aymeloglu et al. |
| 2010/0070842 A1 | 3/2010 | Aymeloglu et al. |
| 2010/0070844 A1* | 3/2010 | Aymeloglu et al. .......... 715/229 |
| 2010/0070845 A1 | 3/2010 | Facemire et al. |
| 2010/0070897 A1 | 3/2010 | Aymeloglu et al. |
| 2010/0073315 A1 | 3/2010 | Lee et al. |
| 2010/0076813 A1 | 3/2010 | Ghosh et al. |
| 2010/0082541 A1 | 4/2010 | Kottomtharayil |
| 2010/0082671 A1 | 4/2010 | Li et al. |
| 2010/0094765 A1 | 4/2010 | Nandy |
| 2010/0098318 A1 | 4/2010 | Anderson |
| 2010/0100963 A1 | 4/2010 | Mahaffey |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0145902 A1 | 6/2010 | Boyan et al. |
| 2010/0145909 A1 | 6/2010 | Ngo |
| 2010/0161646 A1 | 6/2010 | Ceballos et al. |
| 2010/0161735 A1 | 6/2010 | Sharma |
| 2010/0162176 A1 | 6/2010 | Dunton |
| 2010/0162371 A1 | 6/2010 | Geil |
| 2010/0169192 A1 | 7/2010 | Zoldi et al. |
| 2010/0169376 A1 | 7/2010 | Chu |
| 2010/0169405 A1 | 7/2010 | Zhang |
| 2010/0191563 A1 | 7/2010 | Schlaifer et al. |
| 2010/0198684 A1 | 8/2010 | Eraker et al. |
| 2010/0199167 A1 | 8/2010 | Uematsu et al. |
| 2010/0199225 A1 | 8/2010 | Coleman et al. |
| 2010/0204983 A1 | 8/2010 | Chung et al. |
| 2010/0205108 A1 | 8/2010 | Mun |
| 2010/0205662 A1 | 8/2010 | Ibrahim et al. |
| 2010/0223260 A1 | 9/2010 | Wu |
| 2010/0228812 A1 | 9/2010 | Uomini |
| 2010/0235915 A1 | 9/2010 | Memon et al. |
| 2010/0238174 A1 | 9/2010 | Haub et al. |
| 2010/0250412 A1 | 9/2010 | Wagner |
| 2010/0262688 A1 | 10/2010 | Hussain et al. |
| 2010/0262901 A1 | 10/2010 | DiSalvo |
| 2010/0280851 A1 | 11/2010 | Merkin |
| 2010/0280857 A1 | 11/2010 | Liu et al. |
| 2010/0283787 A1 | 11/2010 | Hamedi et al. |
| 2010/0293174 A1 | 11/2010 | Bennett et al. |
| 2010/0306285 A1 | 12/2010 | Shah et al. |
| 2010/0306713 A1 | 12/2010 | Geisner et al. |
| 2010/0306722 A1 | 12/2010 | LeHoty et al. |
| 2010/0312530 A1 | 12/2010 | Capriotti |
| 2010/0312837 A1 | 12/2010 | Bodapati et al. |
| 2010/0313119 A1 | 12/2010 | Baldwin et al. |
| 2010/0313239 A1 | 12/2010 | Chakra et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004626 A1 | 1/2011 | Naeymi-Rad et al. |
| 2011/0016108 A1 | 1/2011 | Pelenur et al. |
| 2011/0029526 A1 | 2/2011 | Knight et al. |
| 2011/0035396 A1 | 2/2011 | Merz et al. |
| 2011/0041084 A1 | 2/2011 | Karam |
| 2011/0047159 A1 | 2/2011 | Baid et al. |
| 2011/0047540 A1 | 2/2011 | Williams et al. |
| 2011/0055074 A1 | 3/2011 | Chen et al. |
| 2011/0060753 A1 | 3/2011 | Shaked et al. |
| 2011/0061013 A1 | 3/2011 | Bilicki et al. |
| 2011/0066497 A1 | 3/2011 | Gopinath et al. |
| 2011/0066933 A1 | 3/2011 | Ludwig |
| 2011/0074788 A1 | 3/2011 | Regan et al. |
| 2011/0074811 A1 | 3/2011 | Hanson et al. |

(56) References Cited

U.S. PATENT DOCUMENTS

| | | |
|---|---|---|
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0093490 A1 | 4/2011 | Schindlauer et al. |
| 2011/0099133 A1 | 4/2011 | Chang et al. |
| 2011/0099628 A1 | 4/2011 | Lanxner et al. |
| 2011/0107196 A1 | 5/2011 | Foster |
| 2011/0117878 A1 | 5/2011 | Barash et al. |
| 2011/0119100 A1 | 5/2011 | Ruhl et al. |
| 2011/0131082 A1 | 6/2011 | Manser et al. |
| 2011/0131122 A1 | 6/2011 | Griffin et al. |
| 2011/0131547 A1 | 6/2011 | Elaasar |
| 2011/0137766 A1 | 6/2011 | Rasmussen et al. |
| 2011/0145401 A1 | 6/2011 | Westlake |
| 2011/0153384 A1 | 6/2011 | Horne et al. |
| 2011/0153592 A1 | 6/2011 | DeMarcken |
| 2011/0161096 A1 | 6/2011 | Buehler et al. |
| 2011/0161409 A1 | 6/2011 | Nair |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0179042 A1 | 7/2011 | Aymeloglu et al. |
| 2011/0179048 A1 | 7/2011 | Satlow |
| 2011/0185316 A1 | 7/2011 | Reid et al. |
| 2011/0185401 A1 | 7/2011 | Bak et al. |
| 2011/0208565 A1 | 8/2011 | Ross et al. |
| 2011/0208724 A1 | 8/2011 | Jones et al. |
| 2011/0208822 A1 | 8/2011 | Rathod |
| 2011/0213655 A1 | 9/2011 | Henkin |
| 2011/0218934 A1 | 9/2011 | Elser |
| 2011/0218955 A1 | 9/2011 | Tang |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0225586 A1 | 9/2011 | Bentley et al. |
| 2011/0231305 A1 | 9/2011 | Winters |
| 2011/0238495 A1 | 9/2011 | Kang |
| 2011/0251951 A1 | 10/2011 | Kolkowitz |
| 2011/0252282 A1 | 10/2011 | Meek et al. |
| 2011/0258072 A1 | 10/2011 | Kerker et al. |
| 2011/0258158 A1 | 10/2011 | Resende et al. |
| 2011/0258216 A1 | 10/2011 | Supakkul et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0270871 A1 | 11/2011 | He et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2011/0321008 A1 | 12/2011 | Jhoney et al. |
| 2012/0004894 A1 | 1/2012 | Butler |
| 2012/0011238 A1 | 1/2012 | Rathod |
| 2012/0011245 A1 | 1/2012 | Gillette et al. |
| 2012/0013684 A1 | 1/2012 | Robertson et al. |
| 2012/0019559 A1 | 1/2012 | Siler et al. |
| 2012/0022945 A1 | 1/2012 | Falkenborg et al. |
| 2012/0030140 A1 | 2/2012 | Aymeloglu et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0065987 A1 | 3/2012 | Farooq et al. |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084184 A1 | 4/2012 | Raleigh |
| 2012/0084287 A1 | 4/2012 | Lakshminarayan et al. |
| 2012/0101952 A1 | 4/2012 | Raleigh et al. |
| 2012/0102022 A1 | 4/2012 | Miranker et al. |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0131512 A1 | 5/2012 | Takeuchi et al. |
| 2012/0136804 A1 | 5/2012 | Lucia |
| 2012/0137235 A1 | 5/2012 | T S et al. |
| 2012/0143816 A1 | 6/2012 | Zhang et al. |
| 2012/0144335 A1 | 6/2012 | Abeln et al. |
| 2012/0158585 A1 | 6/2012 | Ganti |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0159449 A1 | 6/2012 | Arnold et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0174057 A1 | 7/2012 | Narendra et al. |
| 2012/0180002 A1 | 7/2012 | Campbell et al. |
| 2012/0188252 A1 | 7/2012 | Law |
| 2012/0191446 A1 | 7/2012 | Binsztok et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0197657 A1 | 8/2012 | Prodanovic |
| 2012/0197660 A1 | 8/2012 | Prodanovic |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0278249 A1 | 11/2012 | Duggal et al. |
| 2012/0284345 A1 | 11/2012 | Costenaro et al. |
| 2012/0284670 A1 | 11/2012 | Kashik et al. |
| 2012/0284719 A1 | 11/2012 | Phan et al. |
| 2012/0290506 A1 | 11/2012 | Muramatsu et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0013577 A1 | 1/2013 | Fee et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0024731 A1 | 1/2013 | Shochat et al. |
| 2013/0036346 A1 | 2/2013 | Cicerone |
| 2013/0046635 A1 | 2/2013 | Grigg et al. |
| 2013/0046842 A1 | 2/2013 | Muntz et al. |
| 2013/0054306 A1 | 2/2013 | Bhalla |
| 2013/0054551 A1 | 2/2013 | Lange |
| 2013/0055264 A1 | 2/2013 | Burr et al. |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096968 A1 | 4/2013 | Van Pelt et al. |
| 2013/0096988 A1 | 4/2013 | Grossman et al. |

(56) References Cited

U.S. PATENT DOCUMENTS

| | | |
|---|---|---|
| 2013/0097130 A1 | 4/2013 | Bingol et al. |
| 2013/0097482 A1 | 4/2013 | Marantz et al. |
| 2013/0101159 A1 | 4/2013 | Chao et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0124193 A1 | 5/2013 | Holmberg |
| 2013/0124567 A1 | 5/2013 | Balinsky et al. |
| 2013/0132348 A1 | 5/2013 | Garrod |
| 2013/0150004 A1 | 6/2013 | Rosen |
| 2013/0151148 A1 | 6/2013 | Parundekar et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0198624 A1 | 8/2013 | Aymeloglu et al. |
| 2013/0218974 A1 | 8/2013 | Cao et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226944 A1 | 8/2013 | Baid et al. |
| 2013/0226953 A1 | 8/2013 | Markovich et al. |
| 2013/0231862 A1 | 9/2013 | Delling et al. |
| 2013/0232045 A1 | 9/2013 | Tai et al. |
| 2013/0232220 A1 | 9/2013 | Sampson |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0262328 A1 | 10/2013 | Federgreen |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0288719 A1 | 10/2013 | Alonzo |
| 2013/0290011 A1 | 10/2013 | Lynn et al. |
| 2013/0290161 A1 | 10/2013 | Aymeloglu et al. |
| 2013/0290825 A1 | 10/2013 | Arndt et al. |
| 2013/0293553 A1 | 11/2013 | Burr et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2013/0325826 A1 | 12/2013 | Agarwal et al. |
| 2014/0006404 A1 | 1/2014 | McGrew et al. |
| 2014/0012724 A1 | 1/2014 | O'Leary et al. |
| 2014/0012796 A1 | 1/2014 | Petersen et al. |
| 2014/0012886 A1 | 1/2014 | Downing et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0074888 A1 | 3/2014 | Potter et al. |
| 2014/0081685 A1 | 3/2014 | Thacker et al. |
| 2014/0089339 A1 | 3/2014 | Siddiqui et al. |
| 2014/0095273 A1 | 4/2014 | Tang et al. |
| 2014/0095363 A1 | 4/2014 | Caldwell |
| 2014/0095509 A1 | 4/2014 | Patton |
| 2014/0108068 A1 | 4/2014 | Williams |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0115589 A1 | 4/2014 | Marinelli, III et al. |
| 2014/0115610 A1 | 4/2014 | Marinelli, III et al. |
| 2014/0120864 A1 | 5/2014 | Manolarakis et al. |
| 2014/0123279 A1 | 5/2014 | Bishop et al. |
| 2014/0129261 A1 | 5/2014 | Bothwell et al. |
| 2014/0129936 A1 | 5/2014 | Richards et al. |
| 2014/0136285 A1 | 5/2014 | Carvalho |
| 2014/0143009 A1 | 5/2014 | Brice et al. |
| 2014/0143025 A1 | 5/2014 | Fish et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0208281 A1 | 7/2014 | Ming |
| 2014/0214482 A1 | 7/2014 | Williams et al. |
| 2014/0214579 A1 | 7/2014 | Shen et al. |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229554 A1 | 8/2014 | Grunin et al. |
| 2014/0237354 A1 | 8/2014 | Burr et al. |
| 2014/0244284 A1 | 8/2014 | Smith |
| 2014/0244388 A1 | 8/2014 | Manouchehri et al. |
| 2014/0258285 A1 | 9/2014 | Lavine |
| 2014/0267294 A1 | 9/2014 | Ma |
| 2014/0267295 A1 | 9/2014 | Sharma |
| 2014/0279824 A1 | 9/2014 | Tamayo |
| 2014/0279865 A1 | 9/2014 | Kumar |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0012509 A1 | 1/2015 | Kirn |
| 2015/0019394 A1 | 1/2015 | Unser et al. |
| 2015/0026622 A1 | 1/2015 | Roaldson et al. |
| 2015/0046481 A1 | 2/2015 | Elliot |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0112641 A1 | 4/2015 | Faraj |
| 2015/0120176 A1 | 4/2015 | Curtis et al. |
| 2015/0134512 A1 | 5/2015 | Mueller |
| 2015/0134666 A1 | 5/2015 | Gattiker et al. |
| 2015/0135256 A1 | 5/2015 | Hoy et al. |
| 2015/0161611 A1 | 6/2015 | Duke et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178743 A1 | 6/2015 | Aymeloglu et al. |
| 2015/0178825 A1 | 6/2015 | Huerta |
| 2015/0178877 A1 | 6/2015 | Bogomolov et al. |
| 2015/0186483 A1 | 7/2015 | Tappan et al. |
| 2015/0186821 A1 | 7/2015 | Wang et al. |
| 2015/0187036 A1 | 7/2015 | Wang et al. |
| 2015/0188872 A1 | 7/2015 | White |
| 2015/0205848 A1 | 7/2015 | Kumar et al. |
| 2015/0212663 A1 | 7/2015 | Papale et al. |
| 2015/0227295 A1 | 8/2015 | Meiklejohn et al. |

(56) References Cited

U.S. PATENT DOCUMENTS

| | | |
|---|---|---|
| 2015/0254220 A1 | 9/2015 | Burr et al. |
| 2015/0261817 A1 | 9/2015 | Harris et al. |
| 2015/0269030 A1 | 9/2015 | Fisher et al. |
| 2015/0309719 A1 | 10/2015 | Ma et al. |
| 2015/0310005 A1 | 10/2015 | Ryger et al. |
| 2015/0317342 A1 | 11/2015 | Grossman et al. |
| 2015/0324868 A1 | 11/2015 | Kaftan et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026923 A1 | 1/2016 | Erenrich et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0162519 A1 | 6/2016 | Stowe et al. |
| 2016/0299652 A1 | 10/2016 | Aymeloglu |
| 2018/0075007 A1 | 3/2018 | Burr et al. |
| 2018/0075126 A1 | 3/2018 | Tamayo |
| 2018/0113740 A1 | 4/2018 | Marinelli et al. |

FOREIGN PATENT DOCUMENTS

| | | |
|---|---|---|
| CA | 2829266 | 6/2017 |
| CN | 102546446 | 7/2012 |
| CN | 103167093 | 6/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014213036 | 1/2015 |
| DE | 102014215621 | 2/2015 |
| EP | 0652513 | 5/1995 |
| EP | 1109116 | 6/2001 |
| EP | 1146649 | 10/2001 |
| EP | 1647908 | 4/2006 |
| EP | 1672527 | 6/2006 |
| EP | 1926074 | 5/2008 |
| EP | 2350817 | 8/2011 |
| EP | 2487610 | 8/2012 |
| EP | 2551799 | 1/2013 |
| EP | 2555126 | 2/2013 |
| EP | 2560134 | 2/2013 |
| EP | 2562709 | 2/2013 |
| EP | 2 634 745 | 9/2013 |
| EP | 2743839 | 6/2014 |
| EP | 2778913 | 9/2014 |
| EP | 2778914 | 9/2014 |
| EP | 2778974 | 9/2014 |
| EP | 2778977 | 9/2014 |
| EP | 2778986 | 9/2014 |
| EP | 2779082 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2876587 | 5/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2911078 | 8/2015 |
| EP | 2911100 | 8/2015 |
| EP | 2921975 | 9/2015 |
| EP | 2940603 | 11/2015 |
| EP | 2940609 | 11/2015 |
| EP | 2963595 | 1/2016 |
| EP | 2993595 | 3/2016 |
| EP | 3002691 | 4/2016 |
| EP | 3009943 | 4/2016 |
| EP | 3032441 | 6/2016 |
| EP | 2634745 | 5/2017 |
| GB | 2366498 | 3/2002 |
| GB | 2513472 | 10/2014 |
| GB | 2513721 | 11/2014 |
| GB | 2508503 | 1/2015 |
| GB | 2516155 | 1/2015 |
| GB | 2517582 | 2/2015 |
| GB | 2508293 | 4/2015 |
| GB | 2518745 | 4/2015 |
| HK | 1194178 | 9/2015 |
| NL | 2012778 | 11/2014 |
| NL | 2013134 | 1/2015 |
| NL | 2013306 | 2/2015 |
| NL | 2011613 | 6/2016 |
| NZ | 624557 | 12/2014 |
| NZ | 622485 | 3/2015 |
| NZ | 616212 | 5/2015 |
| NZ | 616299 | 7/2015 |
| WO | WO 2000/009529 | 2/2000 |
| WO | WO 2000/034895 | 6/2000 |
| WO | WO 01/025906 | 4/2001 |
| WO | WO 2001/088750 | 11/2001 |
| WO | WO 2002/065353 | 8/2002 |
| WO | WO 2005/104736 | 11/2005 |
| WO | WO 2005/116851 | 12/2005 |
| WO | WO 2007/133206 | 11/2007 |
| WO | WO 2008/064207 | 5/2008 |
| WO | WO 2008/121499 | 10/2008 |
| WO | WO 2009/042548 | 4/2009 |
| WO | WO 2009/051987 | 4/2009 |
| WO | WO 2009/061501 | 5/2009 |
| WO | WO 2010/000014 | 1/2010 |
| WO | WO 2010/030913 | 3/2010 |
| WO | WO 2010/030914 | 3/2010 |
| WO | WO 2010/030915 | 3/2010 |
| WO | WO 2010/030917 | 3/2010 |
| WO | WO 2010/030919 | 3/2010 |
| WO | WO 2010/030946 | 3/2010 |
| WO | WO 2010/030949 | 3/2010 |
| WO | WO 2013/030595 | 3/2010 |
| WO | WO 2012/025915 | 3/2012 |
| WO | WO 2012/119008 | 9/2012 |
| WO | WO 2013/010157 | 1/2013 |
| WO | WO 2013/102892 | 7/2013 |

OTHER PUBLICATIONS

Straight Dope Message Board; MS Word: Why always "do you want to save changes?"; 15 pages; Jun. 5, 2007; https://boards.straightdope.com/sdmb/showthread.php?t=423686.*

PCT/US2009/056700 International Search Report & Written Opinion, dated Apr. 15, 2010, 10 pages.

Current Claims, PCT/US2009/056700, 5 pages.

support.microsoft.com, "How Word Creates and Recovers the AutoRecover Files", Jan. 18, 2007, retrieved from the internet, 3 pages, printed Feb. 11, 2010, http://support.microsoft.com/kb/107686.

technet.microsoft.com, "Managing Versions and Checking Documents In and Out (Windows SharePoint Services 2.0)", Aug. 22, 2005, retrieved from the internet, 2 pages, printed Feb. 11, 2010, http://technet.microsoft.com/en-us/library/cc287876.aspx.

office.microsoft.com, Windows SharePointServices, "Introduction to versioning", 2007, retrieved from the internet, 5 pages, printed Feb. 11, 2010, http://office.microsoft.com/en-us/sharepointtechnology/HA100215761033.aspx?mode=print.

www.alamopc.org, "Windows Tips & Tricks", Alamo PC Organization, Mar. 2001, retrieved from the internet, 4 pages, printed Feb. 11, 2010, http://www.alamopc.org/pcalamode/columns/beverley/bb0301.shtml.

betterexplained.com, "A Visual Guide to Version Control", Sep. 27, 2007, retrieved from the internet, 10 pages, printed Feb. 11, 2010, http://betterexplained.com/articles/a-visual-guide-to-version-control/.

(56) References Cited

OTHER PUBLICATIONS

European Patent Office, "Search Report", in application No. 09813693.0-1507, dated Apr. 8, 2014, 7 pages.
European Claims in application No. 09813693.0-1507, dated Apr. 2014, 6 pages.
Conner, Nancy, "Google Apps: The Missing Manual", dated May 1, 2008, O'Reilly, Sabastopol, 6 pages.
Abbey, Kristen, "Review of Google Docs", retrieved from the internet, dated May 1, 2007, 2 pages. Apr. 1, 2007.
"A Tour of Pinboard," <http://pinboard.in/tour> as printed May 15, 2014 in 6 pages.
"The FASTA Program Package," fasta-36.3.4, Mar. 25, 2011, pp. 29.
Anonymous, "Frequently Asked Questions about Office Binder 97," http://web.archive.org/web/20100210112922/http://support.microsoft.com/kb/843147 printed Dec. 18, 2006 in 5 pages.
Bae et al., "Partitioning Algorithms for the Computation of Average Iceberg Queries," DaWaK 2000, LNCS 1874, pp. 276_286.
Ballesteros et al., "Batching: A Design Pattern for Efficient and Flexible Client/Server Interaction," Transactions on Pattern Languages of Programming, Springer Berlin Heildeberg, 2009, pp. 48-66.
Bogle et al., "Reducing Cross-Domain Call Overhead Using Batched Futures," SIGPLAN No. 29, 10 (Oct. 1994) pp. 341-354.
Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51Ð55.
Kitts, Paul, "Chapter 14: Genome Assembly and Annotation Process," The NCBI Handbook, Oct. 2002, pp. 1-21.

Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Russell et al., "NITELIGHT: A Graphical Tool for Semantic Query Construction," 2008, pp. 10.
Sirotkin et al., "Chapter 13: The Processing of Biological Sequence Data at NCBI," The NCBI Handbook, Oct. 2002, pp. 1-11.
Stamos et al., "Remote Evaluation," Journal ACM Transactions on Programming Languages and Systems (TOPLAS) vol. 12, Issue 4, Oct. 1990, pp. 537-564.
Wikipedia, "Machine Code", p. 1-5, printed Aug. 11, 2014.
Wollrath et al., "A Distributed Object Model for the Java System," Proceedings of the 2nd Conference on USENEX, Conference on Object-Oriented Technologies (COOTS), Jun. 17, 1996, pp. 219-231.
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
"GrabUp—What a Timesaver!" <http://atlchris.com/191/grabup/>, Aug. 11, 2008, pp. 3.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html.
Acklen, Laura, "Absolute Beginner's Guide to Microsoft Word 2003," Dec. 24, 2003, pp. 15-18, 34-41, 308-316.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Alur et al., "Chapter 2: IBM InfoSphere DataStage Stages," IBM InfoSphere DataStage Data Flow and Job Design, Jul. 1, 2008, pp. 35-137.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Anonymous, "A Real-World Problem of Matching Records," Nov. 2006, <http://grupoweb.upf.es/bd-web/slides/ullman.pdf> pp. 1-16.
Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Bluttman et al., "Excel Formulas and Functions for Dummies," 2005, Wiley Publishing, Inc., pp. 280, 284-286.
Bradard, Matthew, "Technical Analysis Applied," <http://partners.futuresource.com/fastbreak/2007/0905.htm>, Sep. 5, 2007, pp. 6.
Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.
Breierova et al., "An Introduction to Sensitivity Analysis," Publsihed by Massachusetts Institute of Technology, Cambridge, MA, Oct. 2001, pp. 67.
Capptain—Pilot Your Apps, <http://www.capptain.com> Printed Jul. 18, 2013 in 6 pages.
Chen et al., "A Novel Emergency Vehicle Dispatching System," 2013 IEEE 77th Vehicular Technology Conference, IEEE, Jun. 2, 2013, 5 pages.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

(56) References Cited

OTHER PUBLICATIONS

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Cohn, et al., "Semi-supervised clustering with user feedback," Constrained Clustering: Advances in Algorithms, Theory, and Applications 4.1 (2003): 17-32.
Countly Mobile Analytics, <http://count.ly/> Printed Jul. 18, 2013 in 9 pages.
Definition "Identify", downloaded Jan. 22, 2015, 1 page.
Definition "Overlay", downloaded Jan. 22, 2015, 1 page.
Delicious, <http://delicious.com/> as printed May 15, 2014 in 1 page.
Devanbu et al., "Authentic Third-party Data Publication," 2000, pp. 19, http://www.cs.ucdavis.edu/~devanbu/authdbpub.pdf.
Distimo—App Analytics, <http://www.distimo.com/app-analytics> Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Dreyer et al., "An Object-Oriented Data Model for a Time Series Management System," Proceedings of the 7th International Working Conference on Scientific and Statistical Database Management, Charlottesville, Virginia USA, Sep. 28-30, 1994, pp. 12.
Eklund et al., "A Dynamic Multi-source Dijkstra's Algorithm for Vehicle Routing," Intelligent Information Systems, 1996, pp. 329-333.
Fischer et al., "Populating a Release History Database From Version Control and Bug Tracking Systems," Software Maintenance, 2003, ICSM 2003, Proceedings International Conference, pp. 1-10.
Flurry Analytics, <http://www.flurry.com/> Printed Jul. 18, 2013 in 14 pages.
Frantisek et al., "An Architectural View of Distributed Objects and Components in CORBA, Java RMI and COM/DCOM," Software—Concepts & Tools, vol. 19, No. 1, Jun. 1, 1998, pp. 14-28.
Galliford, Miles, "SnagIt Versus Free Screen Capture Software: Critical Tools for Website Owners," <http://www.subhub.com/articles/free-screen-capture-software>, Mar. 27, 2008, pp. 11.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
Hibbert et al., "Prediction of Shopping Behavior Using a Huff Model Within a GIS Framework," Healthy Eating in Context, Mar. 18, 2011, pp. 16.
Jotshi et al., "Dispatching and Routing of Emergency Vehicles in Disaster Mitigation Using Data Fusion." Socio-Economic Planning Sciences, Pergamon, Amsterdam, Netherlands, vol. 43, No. 1, Mar. 1, 2009, 24 pages.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hart et al., "A Formal Basis for the Heuristic Determination of Minimum Cost Paths," IEEE Transactions on Systems Science and Cybernetics, IEEE, vol. 1, No. 2, Jul. 1, 1968, pp. 100-107.
Kontagent Mobile Analytics, <http://www.kontagent.com/> Printed Jul. 18, 2013 in 9 pages.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
JetScreenshot.com, "Share Screenshots via Internet in Seconds," <http://web.archive.org/web/20130807164204/http://www.jetscreenshot.com/>, Aug. 7, 2013, pp. 1.
Kwout, <http://web.archive.org/web/20080905132448/http://www.kwout.com/> Sep. 5, 2008, pp. 2.
Li et al., "Interactive Multimodal Visual Search on Mobile Device," IEEE Transactions on Multimedia, vol. 15, No. 3, Apr. 1, 2013, pp. 594-607.
Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.
Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Mitzenmacher, Michael, "Compressed Bloom Filters," IEEE/ACM Tranactions on Networking, vol. 10, No. 5, Oct. 2002, pp. 604-612.
Mixpanel—Mobile Analytics, <https://mixpanel.com/> Printed Jul. 18, 2013 in 13 pages.
Mohring et al., "Partitioning Graphs to Speedup Dijkstra's Algorithm," ACM Journal of Experimental Algorithmics, Association of Computing Machinery, New York, New York, vol. 11, Jan. 1, 2006, 29 pages.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.

(56) References Cited

OTHER PUBLICATIONS

Microsoft Office—Visio, "About connecting shapes," <http://office.microsoft.com/en-us/visio-help/about-connecting-shapes-HP085050369.aspx> printed Aug. 4, 2011 in 6 pages.

Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.

Microsoft Windows, "Microsoft Windows Version 2002 Print Out 2," 2002, pp. 1-6.

Microsoft, "Registering an Application to a URI Scheme," <http://msdn.microsoft.com/en-us/library/aa767914.aspx>, printed Apr. 4, 2009 in 4 pages.

Microsoft, "Using the Clipboard," <http://msdn.microsoft.com/en-us/library/ms649016.aspx>, printed Jun. 8, 2009 in 20 pages.

O'Reilly.com, http://oreilly.com/digitalmedia/2006/01/01/mac-os-x-screenshot-secrets.html published Jan. 1, 2006 in 10 pages.

Nadeau et al., "A Survey of Named Entity Recognition and Classification," Jan. 15, 2004, pp. 20.

Nierman, "Evaluating Structural Similarity in XML Documents", 6 pages, 2002.

Nin et al., "On the Use of Semantic Blocking Techniques for Data Cleansing and Integration," 11th International Database Engineering and Applications Symposium, 2007, pp. 9.

Nitro, "Trick: How to Capture a Screenshot As PDF, Annotate, Then Share It," <http://blog.nitropdf.com/2008/03/04/trick-how-to-capture-a-screenshot-as-pdf-annotate-it-then-share/>, Mar. 4, 2008, pp. 2.

Nolan et al., "MCARTA: A Malicious Code Automated Run-Time Analysis Framework," Homeland Security (HST) 2012 IEEE Conference on Technologies for, Nov. 13, 2012, pp. 13-17.

Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.

Online Tech Tips, "Clip2Net—Share files, folders and screenshots easily," <http://www.online-tech-tips.com/free-software-downloads/share-files-folders-screenshots/>, Apr. 2, 2008, pp. 5.

Open Web Analytics (OWA), <http://www.openwebanalytics.com/> Printed Jul. 19, 2013 in 5 pages.

Palantir Technolgies, "Palantir Labs—Timeline," Oct. 1, 2010, retrieved from the internet https://www.youtube.com/watch?v=JCgDW5bru9M retrieved on Aug. 19, 2015.

Palmas et al., "An Edge-Bunding Layout for Interactive Parallel Coordinates" 2014 IEEE Pacific Visualization Symposium, pp. 57-64.

Perdisci et al., "Behavioral Clustering of HTTP-Based Malware and Signature Generation Using Malicious Network Traces" USENIX Mar. 18, 2010 pp. 1-14.

Piwik—Free Web Analytics Software. <http://piwik.org/> Printed Jul. 19, 2013 in18 pages.

Pythagoras Communications Ltd., "Microsoft CRM Duplicate Detection," Sep. 13, 2011, https://www.youtube.com/watch?v=j-7Qis0D0Kc.

Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, pp. 666-669, ISBN: 978-0-7695-3336-0.

Quest, "Toad for ORACLE 11.6—Guide to Using Toad," Sep. 24, 2012, pp. 1-162.

Reedy, Sarah, "Policy and Charging Rules Function (PCRF)," Sep. 13, 2010, http://www.lightreading.com/document.asp?doc_id=680015 printed Dec. 10, 2013 in 4 pages.

Rouse, Margaret, "Olap Cube," <http://searchdatamanagement.techtarget.com/definition/OLAP-cube>, Apr. 28, 2012, 16 pages.

Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.

Sigrist, et al., "PROSITE, a Protein Domain Database for Functional Characterization and Annotation," Nucleic Acids Research, 2010, vol. 38, pp. D161-D166.

SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.

Schroder, Stan, "15 Ways to Create Website Screenshots," <http://mashable.com/2007/08/24/web-screenshots/>, Aug. 24, 2007, pp. 2.

Schwieger, V., "Sensitivity Analysis as a General Tool for Model Optimisation-Examples for Trajectory Estimation," 3rd IAG/12th FIG Symposium, Baden, Germany, May 22-24, 2006, Published by IAG, 2006, pp. 10.

Schwieger, V., "Variance-Based Sensitivity Analysis for Model Evaluation in Engineering Surveys," INGEO 2004 and FIG Regional Central and Eastern European Conference on Engineering Surveying, Nov. 11-13, 2004, Published by INGEO, Bratislava, Slovakia, 2004, pp. 10.

Sekine et al., "Definition, Dictionaries and Tagger for Extended Named Entity Hierarchy," May 2004, pp. 1977-1980.

SnagIt, "SnagIt 8.1.0 Print Out 2," Software release date Jun. 15, 2006, pp. 1-3.

SnagIt, "SnagIt 8.1.0 Print Out," Software release date Jun. 15, 2006, pp. 6.

StatCounter—Free Invisible Web Tracker, Hit Counter and Web Stats, <http://statcounter.com/> Printed Jul. 19, 2013 in 17 pages.

TestFlight—Beta Testing on the Fly, <http://testflightapp.com/> Printed Jul. 18, 2013 in 3 pages.

Traichal et al., "Forecastable Default Risk Premia and Innovations," Journal of Economics and Finance, Fall 1999, vol. 23, No. 3, pp. 214-225.

trak.io, <http://trak.io/> printed Jul. 18, 2013 in 3 pages.

Umagandhi et al., "Search Query Recommendations Using Hybrid User Profile with Query Logs," International Journal of Computer Applications, vol. 80, No. 10, Oct. 1, 2013, pp. 7-18.

UserMetrix, <http://usermetrix.com/android-analytics> printed Jul. 18, 2013 in 3 pages.

Valentini et al., "Ensembles of Learning Machines", M. Marinaro and R. Tagliaferri (Eds.): Wirn Vietri 2002, LNCS 2486, pp. 3-20.

Vose et al., "Help File for ModelRisk Version 5," 2007, Vose Software, pp. 349-353. [Uploaded in 2 Parts].

Wagner et al., "Dynamic Shortest Paths Containers," Electronic Notes in Theoretical Computer Science, vol. 92, No. 1, 2003, pp. 1-19.

Wang et al., "Research on a Clustering Data De-Duplication Mechanism Based on Bloom Filter," IEEE 2010, 5 pages.

Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.

Wollrath et al., "A Distributed Object Model for the Java System," Conference on Object-Oriented Technologies and Systems, Jun. 17-21, 1996, pp. 219-231.

Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.

Xobni, "About Page," http://www.xobni.com/about/ printed Jun. 26, 2014 in 2 pages.

Xobni, "Blog," http://blog.xobni.com/ printed Jun. 26, 2014 in 11 pages.

Xobni, http://www.xobni.com/ printed Jun. 26, 2014 in 5 pages.

Yahoo, <http://web.archive.org/web/20020124161606/http://finance.yahoo.com/q?s=%5elXIC&d=c . . . > printed Mar. 6, 2012 in 2 pages.

Yang et al., "An Enhanced Routing Method with Dijkstra Algorithm and AHP Analysis in GIS-based Emergency Plan," Geoinformatics, 2010 18th International Conference on, IEEE, Piscataway, New Jersey, Jun. 18, 2010, 6 pages.

Yang et al., "HTML Page Analysis Based on Visual Cues", A129, pp. 859-864, 2001.

(56) References Cited

OTHER PUBLICATIONS

Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
Official Communication for European Patent Application No. 15159520.4 dated Jul. 20, 2016, 8 pages.
Official Communication for European Patent Application No. 14158861.6 dated Nov. 2, 2016, 5 pages.
Official Communication for European Patent Application No. 12181585.6 dated Sep. 4, 2015, 9 pages.
Official Communication for European Patent Application No. 12181585.6 dated Jan. 7, 2013, 6 pages.
Conner, Nancy, "Google Apps: The Missing Manual", dated May 1, 2008, O'Reilly Sabastopol, 15 pages.
European Claims in application No. 09 813 693.0-1216, dated Jan. 2019, 5 pages.
European Claims in application No. 09 813 695.5-1216, dated Jan. 2019, 5 pages.
European Patent Office, "Search Report" in application No. 09 813 693.0-1216, dated Jan. 8, 2019, 6 pages.
European Patent Office, "Search Report" in application No. 09 813 695.5-1216 dated Jan. 25, 2019, 13 pages.
U.S. Appl. No. 14/196,814, filed Mar. 4, 2014, First Office Action Interview dated Aug. 13, 2014.
U.S. Appl. No. 14/108,187, filed Dec. 16, 2013, First Office Action Interview dated Mar. 20, 2014.
U.S. Appl. No. 14/332,306, filed Jul. 15, 2017, First Office Action Interview dated May 20, 2016.
U.S. Appl. No. 14/225,006, filed Mar. 25, 2014, Sep. 21, 2015.
U.S. Appl. No. 14/192,767, filed Feb. 27, 2014, First Office Action Interview dated May 6, 2014.
U.S. Appl. No. 14/326,738, filed Jul. 9, 2014, Notice of Allowance dated Nov. 18, 2015.
U.S. Appl. No. 14/102,394, filed Dec. 10, 2013, Office Action dated Mar. 27, 2014.
U.S. Appl. No. 14/192,767, filed Feb. 27, 2014, Interview Summary dated Sep. 24, 2014.
U.S. Appl. No. 14/289,596, filed May 28, 2014, Final Office Action dated Aug. 5, 2015.
U.S. Appl. No. 14/135,289, filed Dec. 19, 2013, Interview Summary dated Apr. 16, 2014.
U.S. Appl. No. 14/268,964, filed May 2, 2014, Office Action dated Jul. 11, 2014.
U.S. Appl. No. 14/192,767, filed Feb. 27, 2014, Notice of Allowance dated Apr. 20, 2015.
U.S. Appl. No. 14/562,420, filed Dec. 16, 2013, Interview Summary dated Apr. 17, 2014.
U.S. Appl. No. 15/847,720, filed Dec. 19, 2017, First Office Action Interview dated Mar. 8, 2018.
U.S. Appl. No. 15/847,720, filed Dec. 19, 2017, First Office Action Interview dated Jun. 12, 2018.
U.S. Appl. No. 14/741,256, filed Jun. 16, 2015, Restriction Requirement dated Feb. 9, 2016.
U.S. Appl. No. 14/222,364, filed Mar. 21, 2014, Office Action dated Dec. 9, 2015.
U.S. Appl. No. 14/961,481, filed Dec. 7, 2015, First Office Action Interview dated Mar. 2, 2016.
U.S. Appl. No. 14/473,860, filed Aug. 29, 2014, First Office Action Interview dated Nov. 4, 2014.
U.S. Appl. No. 14/975,215, filed Dec. 18, 2015, First Office Action Interview dated May 19, 2016.
U.S. Appl. No. 14/135,289, filed Dec. 19, 2013, Interview Summary dated Jul. 4, 2014.
U.S. Appl. No. 14/800,447, filed Jul. 15, 2015, Final Office Action dated Jun. 6, 2016.
U.S. Appl. No. 14/883,498, filed Oct. 14, 2015, First Office Action Interview dated Dec. 24, 2015.
U.S. Appl. No. 14/676,621, filed Apr. 1, 2015, Notice of Allowance dated Feb. 10, 2016.
U.S. Appl. No. 14/479,160, filed Sep. 5, 2014, First Office Action Interview dated Apr. 20, 2016.
U.S. Appl. No. 14/816,599, filed Aug. 3, 2015, Office Action dated Feb. 6, 2018.
U.S. Appl. No. 14/326,738, filed Jul. 9, 2014, First Office Action Interview dated Dec. 2, 2014.
U.S. Appl. No. 14/883,498, filed Oct. 14, 2015, Office Action dated Mar. 17, 2016.
U.S. Appl. No. 14/871,465, filed Sep. 30, 2015, First Office Action Interview dated Feb. 9, 2018.
U.S. Appl. No. 14/800,447, filed Jul. 15, 2015, Interview Summary dated Mar. 3, 2016.
U.S. Appl. No. 14/294,098, filed Jun. 2, 2014, First Office Action Interview dated Aug. 15, 2014.
U.S. Appl. No. 14/618,213, filed Feb. 10, 2015, Office Action dated Mar. 29, 2018.
U.S. Appl. No. 14/715,834, filed May 19, 2015, First Office Action Interview dated Mar. 14, 2016.
U.S. Appl. No. 13/669,274, filed Nov. 5, 2012, Office Action dated May 2, 2016.
U.S. Appl. No. 14/961,481, filed Dec. 7, 2015, Notice of Allowance dated May 2, 2016.
U.S. Appl. No. 14/841,338, filed Aug. 31, 2015, Office Action dated Feb. 18, 2016.
U.S. Appl. No. 13/669,274, filed Nov. 5, 2012, Advisory Action dated Aug. 26, 2015.
U.S. Appl. No. 14/871,465, filed Sep. 30, 2015, First Office Action Interview dated Apr. 11, 2016.
U.S. Appl. No. 12/556,318, filed Sep. 9, 2009, Notice of Allowance dated Apr. 11, 2016.
U.S. Appl. No. 14/562,420, filed Dec. 16, 2013, Office Action dated May 25, 2018.
U.S. Appl. No. 14/562,420, filed Dec. 16, 2013, Final Office Action dated Nov. 17, 2017.
U.S. Appl. No. 15/220,021, filed Jul. 26, 2016, Office Action dated Dec. 14, 2017.
U.S. Appl. No. 15/183,371, filed Jun. 15, 2016, Office Action dated Apr. 6, 2018.
Anonymous, Australia IP Office, Official Communication for Australian Patent Application No. 2014202442 dated Mar. 19, 2015, published in Sydney, Australia, pp. 2-5.
Anonymous, European Patent Office, Official Communication for European Patent Application No. 15190307.7 dated Feb. 19, 2016, published at Munich, Germany, pp. 2-7.
Anonymous, European Patent Office, Official Communication for European Patent Application No. 15188106.7 dated Feb. 3, 2016, pp. 2-8.
Anonymous, European Patent Office, Official Communication for European Patent Application No. 14189344.6 dated Feb. 29, 2016, pp. 3-9.
Ferreira et al., "A Scheme for Analyzing Electronic Payment Systems," published in United States, 1997, pp. 2-10.
Anonymous, Australia IP Office, Official Communication for AU Application No. AU 2014201558 dated Mar. 1, 2018, published in Sydney, Australia, pp. 1-3.
S. Chau, Canada IP Office, Official Communication for Canadian Patent Application No. 2831660 dated Jun. 9, 2015, published in Ottawa, Canada, pp. 1-3.
Anonymous, Agentschap NL, Official Communication for Netherlands Patent Application No. 2011729 dated Aug. 13, 2015, published in Munich, Germany, pp. 1-8.
Goswami, Gautam, "Quite "Weitly" Said!", One Brick at a Time, dated Aug. 21, 2006, 13 pages.
Pedicini et al., "Step by Step, Microsoft Word Version 2002, Chaoter 8 Collaborating With Others", Microsoft Word Version 2002 Step by Step, Microsoft, Redmond, WA, dated Jan. 1, 2001, 18 pages.
B. Copenheaver, USPTO, International Search Report and Written Opinion for Patent Application No. PCT/US2008/077528 dated Dec. 4, 2008, published at Alexandria, Virginia, pp. 3-7.
Anonymous, IP Australia, Official Communication for Australian Patent Application No. 2013251186 dated Mar. 12, 2015, published at Sydney, Australia, pp. 1-47.

(56) References Cited

OTHER PUBLICATIONS

Anonymous, IP Australia, Notice of Acceptance for Australian Patent Application No. 2013251186 dated Nov. 6, 2015, published at Sydney, Australia, pp. 1-2.

A. Strobeck, European Patent Office, Official Communication for European Patent Application No. 15175151.8 dated Nov. 25, 2015, published at the Hague, Netherlands, pp. 2-8.

Anonymous, IP Australia, Notice of Acceptance for Australian Patent Application No. 2014201553 dated Feb. 19, 2018, published at Sydney, Australia, pp. 1-3.

J. Jebson, New Zealand IP Office, Official Communication for New Zealand Patent Application No. 616299 dated Oct. 9, 2013, published at Wellington, NZ, one page.

"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html, pp. 1-2.

Anonymous, European Patent Office, Official Communication for European Patent Application No. 15159520.4 dated Jul. 20, 2016, published at Munich, Germany, 8 pages.

Anonymous, European Patent Office, Official Communication for European Patent Application No. 14158861.6 dated Nov. 2, 2016, 5 pages.

Anonymous, European Patent Office, Official Communication for European Patent Application No. 12181585.6 dated Sep. 4, 2015, 9 pages.

Anonymous, European Patent Office, Official Communication for European Patent Application No. 12181585.6 dated Jan. 7, 2013, 6 pages.

International Search Report and Written Opinion for Patent Application No. PCT/US2009/056700 dated Apr. 19, 2010, 10 pages.

Conner, Nancy, "Google Apps: The Missing Manual", dated May 1, 2008, O'Reilly Co., Sebastopol, California, 15 pages.

Claims in EPO application 09 813 693.0-1216, dated Jan. 2019, 5 pages.

Claims in EP application 09 813 695.5-1216, dated Jan. 2019, 5 pages.

Anonymous, European Patent Office, European Patent Office, "Search Report" in application No. 09 813 693.0-1216, dated Jan. 8, 2019, 6 pages.

Anonymous, European Patent Office, European Patent Office, "Search Report" in application No. 09 813 695.5-1216 dated Jan. 25, 2019, 13 pages.

Official Communication for European Patent Application No. 14158958.0 dated Jun. 3, 2014.

\* cited by examiner

AUTOMATIC CREATION AND SERVER PUSH OF MULTIPLE DISTINCT DRAFTS

PRIORITY CLAIM

This application claims the benefit of Provisional Application No. 61/097,059, entitled "Collaborative Interface Enhancements" and filed Sep. 15, 2008, the entire contents of which is hereby incorporated by reference as if fully set forth herein, under 35 U.S.C. § 119(e). This application further claims the benefit of Provisional Application No. 61/122,695, entitled "WorkFlows, Screenshot Techniques, and Sharing Information across Servers" and filed Dec. 15, 2008, the entire contents of which is hereby incorporated by reference as if fully set forth herein, under 35 U.S.C. § 119(e).

CROSS-REFERENCE TO RELATED APPLICATIONS

This application is related to U.S. patent application Ser. No. 12/556,318, entitled "Modal-less Interface Enhancements" and filed concurrently, the entire contents of which are hereby incorporated by reference for all purposes as if fully set forth herein. This application is also related to U.S. patent application Ser. No. 12/556,313, entitled "One-Click Sharing for Screenshots and Related Documents" and filed concurrently, the entire contents of which are hereby incorporated by reference for all purposes as if fully set forth herein.

FIELD OF THE INVENTION

Embodiments of the invention described herein relate generally to object management, and, more specifically, to techniques for saving and/or sharing objects edited by an application.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Collaborative projects typically require extensive use of document authoring applications. Members of a project team may create documents at their computer using various document authoring applications, and then share those documents with other members of the project team. The other members may view and utilize the information in these shared documents using document authoring applications at other computers.

One way for a project member to share information with another project member is to share an image. An image may communicate information in a variety of ways. For example, an image may depict a chart, graph, map, picture, or textual passage.

One way for a project member to produce an image to share with other project members is for the project member to utilize image generation functionality in a document authoring application. For example, a document authoring application may allow a user to generate images of charts or graphs produced in the course of working with a report document. As another example, a document authoring application may also allow a user to generate a screenshot image of information currently depicted in the application. These images may then be shared with other project members.

Although image sharing is useful for quickly communicating a limited amount of information, a weakness of the above-described techniques is that the techniques do not provide other project members with access to any information other than the information depicted in the image. Nor does the technique allow other project members to use or edit the information depicted in the image.

For example, a first project member may use a document authoring application to create a reporting document with very detailed data regarding stock prices over the course of several years. Using the document authoring application, the project member may then produce an image of a graph that summarizes the detailed data. The first project member may then share that image with other project members. While the other project members would be able to quickly interpret the summary information depicted in the graph, the other project members would be unable to access the more detailed data stored in the reporting document.

One solution to this problem would be for the first project member to send the reporting document to the other project members instead of the image. However, this solution has several drawbacks. First, the solution creates unnecessary copies of the reporting document. The unnecessary copies waste space, create security risks, and introduce potential data synchronization problems. Second, without sharing the image, the first project member loses the benefit of the image's efficiency in quickly communicating an overview of the information in the reporting document. Third, the solution is more labor-intensive for the first project member, since the solution requires the first project member to locate the reporting document in a file system so that it can be attached to an email or otherwise sent to the other project members.

Existing techniques for using document authoring applications are inefficient for a number of reasons. For example, users of document authoring applications often find it necessary to switch quickly to other documents or tasks. In switching to another document or task, a user must often close his or her current document. To avoid losing work on a currently open document, the user is required to save the currently open document before closing it. This requirement slows down the speed with which a user may switch to another document or task. Moreover, a user can sometimes forget to save the currently open document and consequently lose work.

Application designers have proposed various techniques to solve these problems. One such technique is to automatically save changes to a currently open document when the application is caused to close the document. However, this technique is undesirable because the user may not have intended to save the changes, or the user may have intended to save the changes as a different version of the document so that the original version of the document is not overwritten. Another technique prompts the user to confirm that the document should or should not be saved before closing the document. However, this technique still decreases the speed with which the user may switch documents or tasks.

Another technique relies on automatically saving a document periodically in a single auto-saved version. If a document is closed without a save operation having been performed, the auto-saved version may be used to recover unsaved information. For example, upon resumption of an application, the application may check to see whether any auto-saved versions exist. If an auto-saved version does exist, the user is prompted to save or discard the auto-saved version. However, this technique merely shifts the transaction time required for a save operation to a later time. In fact, this technique may create more work for a user, in that the user may be required to locate the auto-saved file and/or save the auto-saved version over the last saved version. Furthermore, a user will still lose any changes made between the time of the last auto-save and the time the document was closed.

As another example of inefficiency in existing techniques for using document authoring applications, consider the task of sharing documents between users of document authoring applications at different systems. A common technique for sharing documents is to email the documents. However, this technique may be inefficient in certain situations. For example, users who share documents in this manner are typically subjected to at least some time delay while waiting for an email to arrive. This technique also results in extraneous copies of the same data. In the event a user wishes to edit data from a shared document, they must also email those changes back to original document author, who must be sure to replace his or her document with the changed version.

Another approach for sharing documents is to store documents on a centralized server. This approach requires a user to know how to use their operating system to navigate to the server and locate the shared documents. This technique further requires that an original document author notify other members of a project team of the existence and location of new documents. The time required to navigate the server and communicate messages regarding the existence and location of new documents represent inefficiencies in the collaborative process.

Other approaches use complex document management or version control applications that require check-in and check-out of documents.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
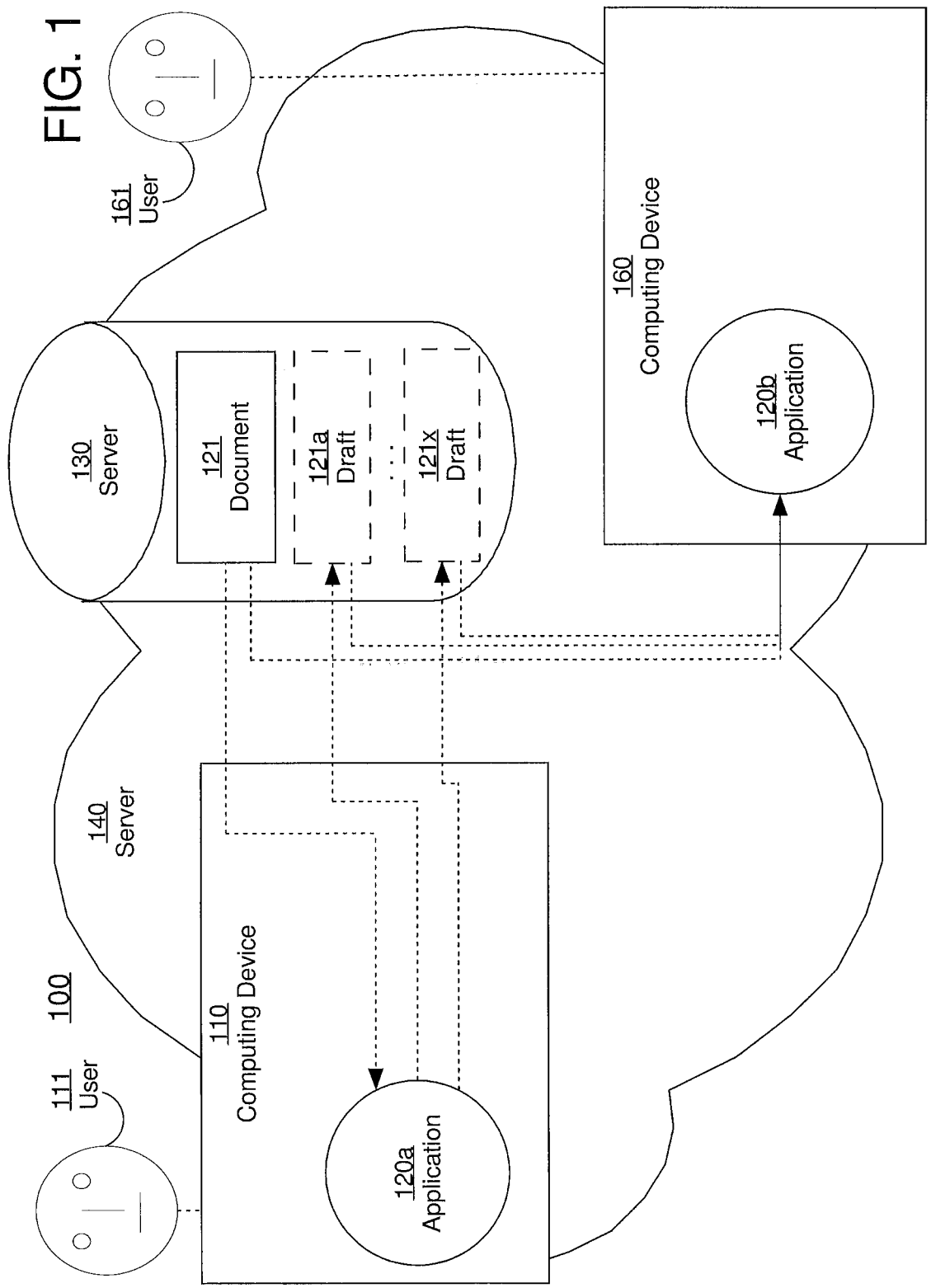
FIG. 1 is a block diagram that illustrates a system 100 that supports project collaboration.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
  1.0. General Overview
    1.1. Terms and Definitions
  2.0. Structural Overview
  3.0. Functional Overview
    3.1. Auto Saving of Drafts
    3.2. User Interaction with Drafts
    3.3. Server-Push of New or Saved Objects
  4.0. Implementation Examples
    4.1. Example Interface for Drafts
    4.2. Example Interface for Server-Pushed Updates to Objects
    4.3. Example Triggering Events
    4.4. Example Draft Format
    4.5. User-Instigated Save Operations
  5.0. Implementation Mechanism—Hardware Overview
  6.0. Extensions and Alternatives
  7.0. Conclusion 1.0. GENERAL OVERVIEW Approaches, techniques, and mechanisms are disclosed for addressing the above-described in and other problems. In an embodiment, more efficient mechanisms are provided for saving changes made to a document when the document is closed. Embodiments also provide mechanisms for distinguishing between changes made during different application sessions involving the document.

According to an embodiment, a document authoring application automatically saves a new draft of a document whenever the application closes the document. Each draft is stored in addition to drafts that were previously stored. Thus, the application stores a separate draft of the document for each application session in which the document was used. The application saves the drafts in such a manner that the drafts are logically associated with each other and their original document. Because of this logical association, whenever the user accesses the document in the application, the application may present to the user a list of the various drafts of the documents. The user may continue working on the last saved draft, or the user may select another draft from which to continue working.

According to an embodiment of the invention, document collaboration mechanisms are integrated into a program application. A document authoring application (also known as "the client") may feature a collaborative document listing interface. The client is connected to a server at which the client and other clients store documents created by users. The client presents the collaborative document listing interface to a user using, for example, a sidebar, window pane, or other graphical interface component. The collaborative document listing interface lists document identifiers for various documents on the server that are accessible to the client's user. The client's user can open a document by selecting a corresponding document identifier in the document listing interface.

When a second user saves a new document to the server, the first user's client automatically updates the document listing interface to display data for the new document. Deletion and renaming operations at a second client may likewise result in automatic updates at the document listing interface of the first client. In some embodiments, this automatic updating occurs as a result of the first client periodically polling the server for new documents. In other embodiments, the server immediately pushes data indicating document additions, changes, and deletions to clients.

In other aspects, the invention encompasses a computer apparatus and a computer-readable medium configured to carry out the foregoing steps.

In an embodiment, an application creates multiple drafts of an object. The application automatically creates each draft of the multiple drafts in response to one or more triggering events. The one or more triggering events include one or more of: a first command that causes the application to close the object; or a second command that causes the application to generate output for the object, wherein the output is different than the draft. The application causes each of the multiple drafts to be stored concurrently, in association with the object.

An embodiment comprises: receiving a command to open the object, and in response to the command, opening a most recently created draft of said multiple drafts. An embodiment comprises: presenting a list of the multiple drafts, receiving a selection of a particular draft from the list of the multiple drafts, and in response to receiving the selection of the particular draft, opening the particular draft. In an embodiment, the list of the multiple drafts includes, for each of the multiple drafts, data indicating a time at which the draft was saved. In an embodiment, the application creates the multiple drafts without deleting any draft. In an embodiment, the application automatically creates each draft in response to the one or more triggering events, without user intervention. In an embodiment, the output is one of a report, image, printout, or link. In an embodiment, each of the multiple drafts is stored within the object. In an embodiment, each of the multiple drafts is stored external to the object and includes an identifier for the object. In an embodiment, the one or more triggering events are each commands that cause the application to close the object. In an embodiment, the command that causes the application to close the object is one of an instruction to close the object, an instruction to open another object, or an instruction to terminate the application. In an embodiment, the one or more triggering events are each commands that cause the application to generate output for the object, wherein the output is different than the draft.

In an embodiment, an application opens an object. The application receives first input that causes the application to modify the object. The application receives a first command that causes the application to close the object. In response to the first command, the application creates a first draft of the object and storing the first draft in association with the object. Subsequent to the first command, the application again opens the object. The application receives second input that causes the application to modify the object. The application receives a second command that causes the application to close the object. In response to the second command, the application creates a second draft of the object and storing the second draft in association with the object, without deleting the first draft of the object.

In an embodiment, the application displays a list of drafts associated with object, the list of drafts including the first draft and the second draft. The application receives a user selection of a particular draft from the list of drafts. The application opens the particular draft. In an embodiment, the steps of: in response to the first command, the application creating a first draft of the object and storing the first draft in association with the object, and in response to the second command, the application creating a second draft of the object and storing the second draft in association with the object, are performed without user intervention.

An embodiment comprises presenting an interface comprising a list of objects stored at a location on a server. While presenting the interface, without user intervention, and further without polling the server, data is received from the server indicating the availability of a new object at the server. In response to the data, the list of objects is updated to include the new object. In an embodiment, the new object is a draft of an existing object in the list of objects, and the updated list of objects is organized in a hierarchy indicating that the draft is associated with the existing object.

1.1. Terms and Definitions

For convenience, various embodiments of the techniques described herein are described with respect to "documents." As used herein, a document is any type of object, including files and other resources, that embodies, encapsulates, or encodes information in structured data. Specifically, the data for a document is structured in such a manner so as to be understood by one or more document authoring applications. An application understands structured data when the application, upon reading the data, may perform various actions with the information represented by the object, such as presenting the information to a user. Documents may include word processing files, PDF files, images, and any other form of structured data. Moreover, a document authoring application is any application that may interpret a document in such a manner so as to deliver one or more visual presentations of the information embodied, encapsulated, or encoded within the document.

An example method of sharing information from a document follows. The steps described above are only examples of steps that may be employed according to an embodiment of the invention. Other embodiments may require more or fewer steps, in different orders.

An application "opens" a document. The application may, for example, open the document for viewing or editing.

The application displays information from the document in a graphical user interface (GUI). As used herein, "information from the document" may be any data contained in the actual document, as well as any information collected or generated based on the data within the document. For example, the document may contain data that, when interpreted by the application, causes the application to collect information from one or more databases and then format that information for display in a graphical user interface. One such document may contain, for instance, data that causes the application to generate an interactive display of graphed financial data.

A user submits input that indicates that the user wishes to generate an image based on information from the document. The input may be any suitable input, including, for example, a keystroke, control selection, or mouse click. The user may submit this input to the application itself, or the user may submit it to any other process running on the computing device, such as a background or system process that listens for certain input. For instance, a background application may feature one or more buttons for receiving such input. As another example, an operating system may listen for a certain keystroke combination that indicates that the user wishes to take a screenshot.

According to an embodiment, the input comprises the user clicking on a "one-click sharing" button. For example, an example GUI of an application may includes a visual representation of a financial document named "new investigation." A "one-click sharing" button allows a user to submit input indicating the user's intent to take a screenshot of the information presented in the GUI. In response to a user clicking on the button, the application may (1) take a screenshot of the information in the GUI, (2) generate a link to the document "new investigation," and (3) place both the link and the screenshot in a system clipboard for use in other applications.

According to an embodiment, the input is a single input event. For example, the input may be a single mouse click, a single menu selection, or single keystroke combination.

According to an embodiment, the input is received subsequent to an initial input indicating that the user wishes to take a formatted screenshot, and/or one or more additional inputs to an interface for formatting or filtering the screenshot.

In response to the input from the user, the application or process that received the input generates an image based on information from the document. The image indicates a visual representation of at least a portion of the information. For example, the application may take a screenshot of the information displayed in the GUI. Or, the application may execute an image generation routine to translate the document or portions thereof into visual information. The image may be in any suitable format, including bitmap (BMP), Portable Document Format (PDF), Tagged Image Format (TIFF), or Joint Photographic Experts Group (JPEG).

The generated image may depict a variety of information stored in or generated from a currently opened document. For example, the image may be a screenshot of information currently being presented to the user, such as graphs or tables. The screenshot may comprise an image bitmap of the current application window or active application window. The screenshot may be of the entire application window, or a designated portion thereof. As another example, the application may feature built-in routines for generating various summary images of the document in response to a user selecting various buttons or menu items in the graphical interface.

In some embodiments a process other than the original application (such as a background application or an operating system service) may be responsible for receiving the input from the user. In some embodiments, this other process may communicate with the original application via an application programming interface (API) to obtain from the application any information necessary for the process to perform the image generation. Additionally, the process may also utilize this API to cause the application to perform some or all of the above.

For convenience, various embodiments of the techniques described herein are described with respect to "screenshots." Generally, a screenshot is an image that captures the graphical content of a computer screen at a given time, encoded as data in an image-based format (e.g. a bitmap file). However, the techniques described herein are applicable to many types of media other than "screenshots," including other types of images, slideshows, presentations, and videos. Thus, unless otherwise noted, any technique or step described herein as involving a "screenshot" or an image, is likewise applicable to any media derived from or based on a document being viewed or otherwise utilized in a document authoring application.

In some embodiments, the original application may save a reference draft of the document just prior to creating the image. A link may refer to this reference draft of the document instead of the document draft that was originally opened by the user. The reference draft may be write-protected so as to ensure that the reference draft always includes the same information that was contained in the document at the time the image was generated.

2.0. STRUCTURAL OVERVIEW

FIG. 1 is a block diagram that illustrates a system 100 that supports project collaboration, according to an embodiment of the invention. System 100 may be any system in which document authoring applications are utilized, including a financial analysis system such as deployed by Palantir Finance.

System 100 includes a computing device 110 operated by a user 111. Computing device 110 executes an application 120a. Application 120a is a document authoring application, such as a web browser, word processor, or Palantir Finance client. Application 120a allows user 111 to view and edit document 121. As depicted, document 121 is structured data stored in memory at server 130. However, document 121 may be stored at any location accessible to application 120a, including at computing device 110.

Server 130 is a computing device connected to system 100 via a network 140. Network 140 may be, for instance, an internet or intranet. Server 130 may be any computing device capable of sharing structured data with computing devices connected to network 140, including a web server, file server, or Palantir Finance server.

While using application 120a, user 111 may periodically issue commands that cause application 120a to close document 121. Such commands may include, among others, a command to close document 121, a command to close application 120a, a command to switch to editing another document in application 120a, and so on. In response to each of such commands, application 120a may generate a new draft of document 121, as illustrated by drafts 121a-121x. Each of drafts 121a-121x is data indicating a different version of document 121. Application 120a may also save drafts 121a-121x in response events other than commands that cause application 120a to close document 121, including commands that explicitly instruct application 120a to save a new draft, commands that cause application 120a to share document 121 with another user, and commands that cause application 120a to generate output based on document 121.

Application 120a may save these drafts 121a-121x in association with the original document 121, so that when user 111 later reopens document 121, application 120a may easily provide user 111 with a listing of the different drafts of document 121 that have been created. From this listing, user 111 may access and/or resume working with any of drafts 121a-121x.

As depicted, each of drafts 121a-121x are stored separately from document 121. However, some or all of drafts 121a-121x may be stored inside of document 121. Drafts 121a-121x may include a full copy of the version of document 121 that they represent, or drafts 121a-121x may merely constitute data from which the represented version may be derived, such as differential data indicating changes since a specified previous draft. In some embodiments, document 121 is itself a draft, including a complete copy of an original version of the document. In other embodiments, document 121 is a meta-object, and its document data is stored entirely in drafts 121a-121x.

System 100 further includes computing device 160 operated by user 161. Computing device 110 executes an application 120b. Application 120b is any application capable of viewing document 121, including another instance of application 120a. Application 120b includes an interface for accessing documents and drafts at server 130. When document 121 and/or drafts 121a-121x are added or modified at server 130, server 130 "pushes" information to application 120b indicating that the document or draft has been created or modified. In response to this information, application 120b instantly updates its listing of documents and drafts at server 130. Alternatively, application 120b may poll server 130 periodically to determine if new drafts exist.

System 100 is but one example of a system in which the techniques disclosed herein may be practiced. Various embodiments of the invention may be practiced in other systems having more or fewer components. For example, some embodiments featuring only the auto-saving of drafts may not require a server 130 or computing device 160. As another example, some embodiments featuring only a server that pushes new or updated objects, may not involve drafts 121a-121x.

3.0. FUNCTIONAL OVERVIEW

3.1. Auto Saving of Drafts

According to an embodiment of the invention, an application creates multiple drafts of an object. The application automatically creates each draft of the multiple drafts in response to one or more triggering events. The one or more triggering events may include, for example, a command that causes the application to close the object or a command that causes the application to generate output for the object. Outputs are one of: a report, image, printout, or link. Each of the multiple drafts to be stored concurrently, in association with the object. In other words, previously saved drafts are preserved by the application instead of overwritten.

According to an embodiment, each of the multiple drafts includes information associating the draft with a specific session in which the draft was generated. A "session" refers to a period of time between an application opening the object for editing and a triggering event. For example, this information may include an opening and/or closing timestamp for the session. The application may later use this session-specifying information to present an interface allowing a user to select from amongst the multiple drafts of the object.

Figure 2:
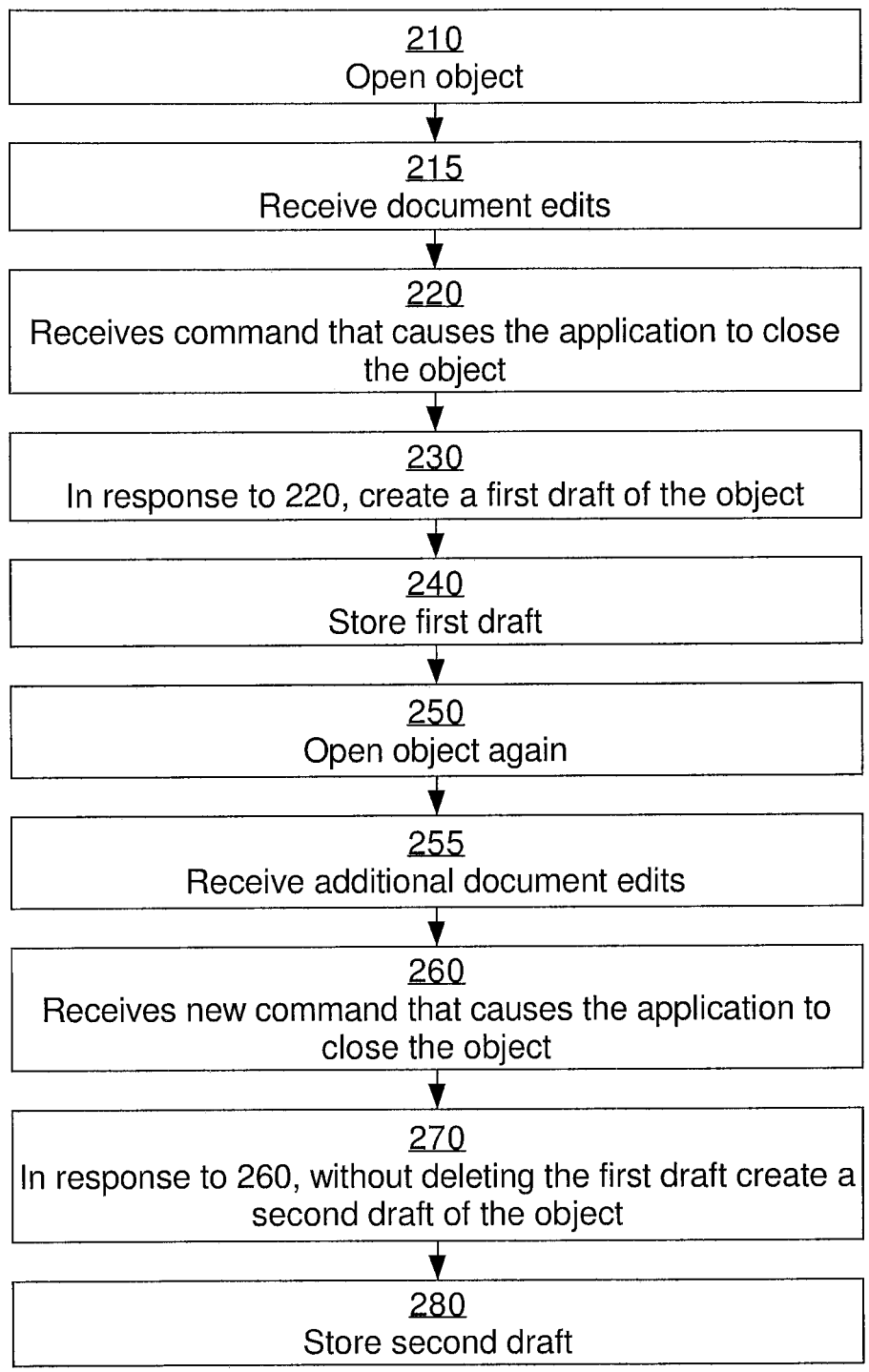
FIG. 2 is a flow chart 200 illustrating a method for auto-saving drafts.

FIG. 2 is a flow chart 200 illustrating a method for auto-saving drafts according to an embodiment. At step 210, an application, such as application 120a, opens an object, such as document 120. As used herein, the terms "opening an object" and "opening a document" refer to the application loading a copy of object or document from a storage location such as a non-volatile memory into a location in volatile memory.

At step 215, the application receives input that causes the application to modify the object in the volatile memory, but not in the storage location. For example, the application may receive input identifying user edits to the document. Or, the application may receive information indicating that a resource relied upon by the object has changed.

At step 220, after having modified the document in step 215, the application receives a command that causes the application to close the object. As used herein, the terms "closing the object" and "closing the document" refer to the application removing the modified copy of the object or document from the location in volatile memory in which it was loaded during step 210. Such removal may occur, for instance, because of the termination of the application instance or application thread that opened the object or document.

Step 220 may, for example, comprise any of several user actions that cause the application to close the document. A user may close the application window, or the user may perform an action that causes the application to load a different document in place of the current document. The application may also automatically save a new draft when it is forced to close a document in response to application or system events, such as an inactivity timeout, a request from a memory management component to release memory, a user logout, or a system restart.

At step 230, in response to the command of step 220, before closing the object, the application creates a first draft of the object, such as draft 121a. At step 240, the application stores this first draft in association with the object, for example in a same storage directory from which the object was loaded in step 210. The application may store the draft in association with the object using a variety of techniques, as discussed in section 4.4.

Subsequent to the command of step 220, the application again opens the object at step 250. At step 255, the application again receives input that causes the application to modify the object.

At step 260, after having modified the document in step 255, the application receives another command that causes the application to close the object.

At step 270, in response to the command of step 260, before closing the object, the application creates a second draft of the object. At step 280, the application stores a second draft in association with the object, without deleting the first draft of the object. Again, the application may store the draft in association with the object using a variety of techniques, as discussed in section 4.4. Thus, upon completion of flow chart 200, the object will be associated with two different drafts reflecting changes from two different sessions.

Although logically presented as separate steps, steps 230 and 240 may in fact be accomplished by a single step of saving the new draft to a storage medium. The same is also true of steps 270 and 280.

In some embodiments, steps 230 and 270 may be performed in response to events other than the commands of steps 220 or 260. Example triggering events are discussed in section 4.3.

3.2. User Interaction with Drafts

Figure 3:
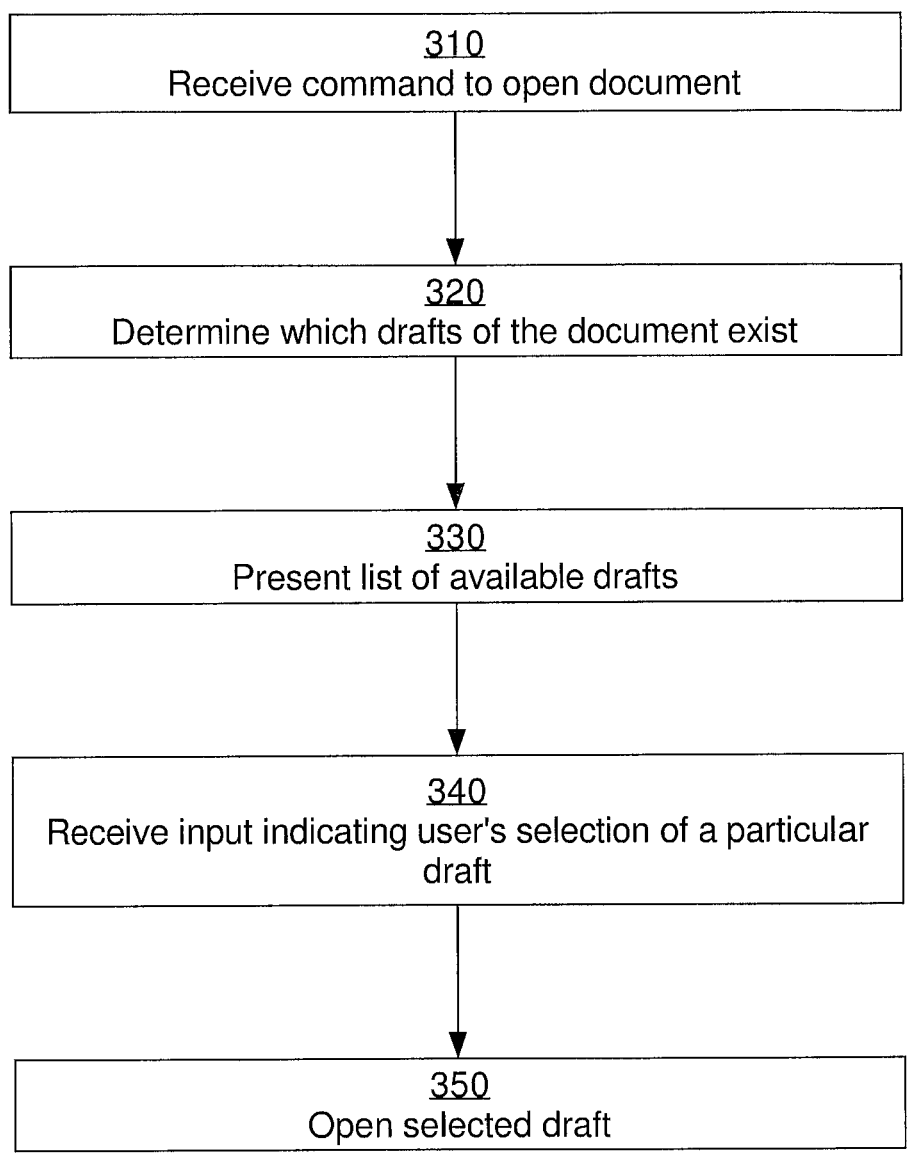
FIG. 3 is a flow chart 300 illustrating a method for facilitating user interaction with saved drafts of an object.

FIG. 3 is a flow chart 300 illustrating a method for facilitating user interaction with saved drafts of a document, according to an embodiment.

At step 310, an application receives a command to open the document for viewing or editing. In some embodiments, the application immediately responds to this command by opening the original document or the most recently saved draft. However, the user may subsequently select other drafts for viewing and editing via the subsequent steps. In other embodiments, the application waits for the subsequent steps to open any documents or drafts.

At step 320, the application determines which, if any, drafts exist for the document. The application may, for instance, search through a repository of files for drafts of the document. In finding drafts, the application may utilize stored metadata, information about the file system structure, or any other indicator of logical association between a draft and an original document. In an embodiment, a server storing the drafts, such as server 130, features an API by which the application may request a list of drafts for a document. The exact technique used to identify drafts for an object will depend upon the manner in which the application stores drafts, as discussed in section 4.4.

At step 330, the application then presents to the user a list of available drafts. For example, in the case of the object opened during flow 200 of FIG. 2, the application may display for the object a list that includes the first draft and the second draft. An example interface for presenting a list of drafts is described in section 4.1. The application may skip this and subsequent steps if no drafts exist.

At step 340, the application may receive input indicating user's selection of a particular draft from the displayed list. At step 350, upon the user selection of the particular draft, the application may open and present the draft to the user for viewing and editing.

In some embodiments, the application may allow a user to delete drafts. For example, the user may select the draft using a draft listing. The user may then press a "delete" key to erase the draft.

3.3. Server-push of New or Saved Objects

Figure 4:
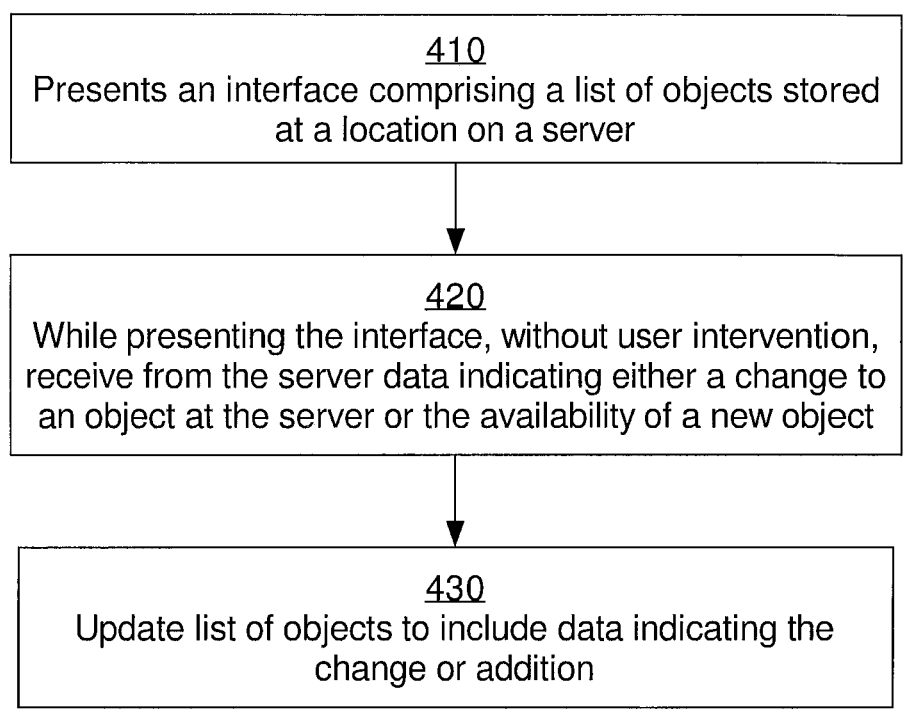
FIG. 4 is a flow chart 400 illustrating a method for a server pushing new or saved objects to a user.

FIG. 4 is a flow chart 400 illustrating a method for a server pushing new or saved objects to a user, according to an embodiment.

At step 410, a client, such as application 120a, presents an interface comprising a list of objects stored at a location on a server, such as server 130. One example of such an interface is described in section 4.2.

At step 420, while presenting the interface, without user intervention, the client receives from the server data indicating either a change to an object at the server, or the availability of a new object at the server. For example, the client may receive data indicating that metadata—such as an object name or timestamp—for an object has changed. This metadata may be metadata that is currently being displayed in the interface. As another example, the client may receive information indicating that a new draft of an existing object has been added to the server. In an embodiment, step 420 is further accomplished without the client polling the server. For example, the server may send to the client unsolicited announcements of new or changed objects at the server.

At step 430, in response to the data received in step 420, the client updates its list of objects to reflect the change or addition. For example, if the client had received data indicating a new name for an object, the client would update the list of objects to reflect the new name. As another example, if the client had received notification of the availability of a new draft of an existing object, the client would update the list of objects to include a tree-like hierarchy indicating the new draft as a "leaf" of a node for the existing object.

4.0. IMPLEMENTATION EXAMPLES

4.1. Example Interface for Drafts

Figure 5:
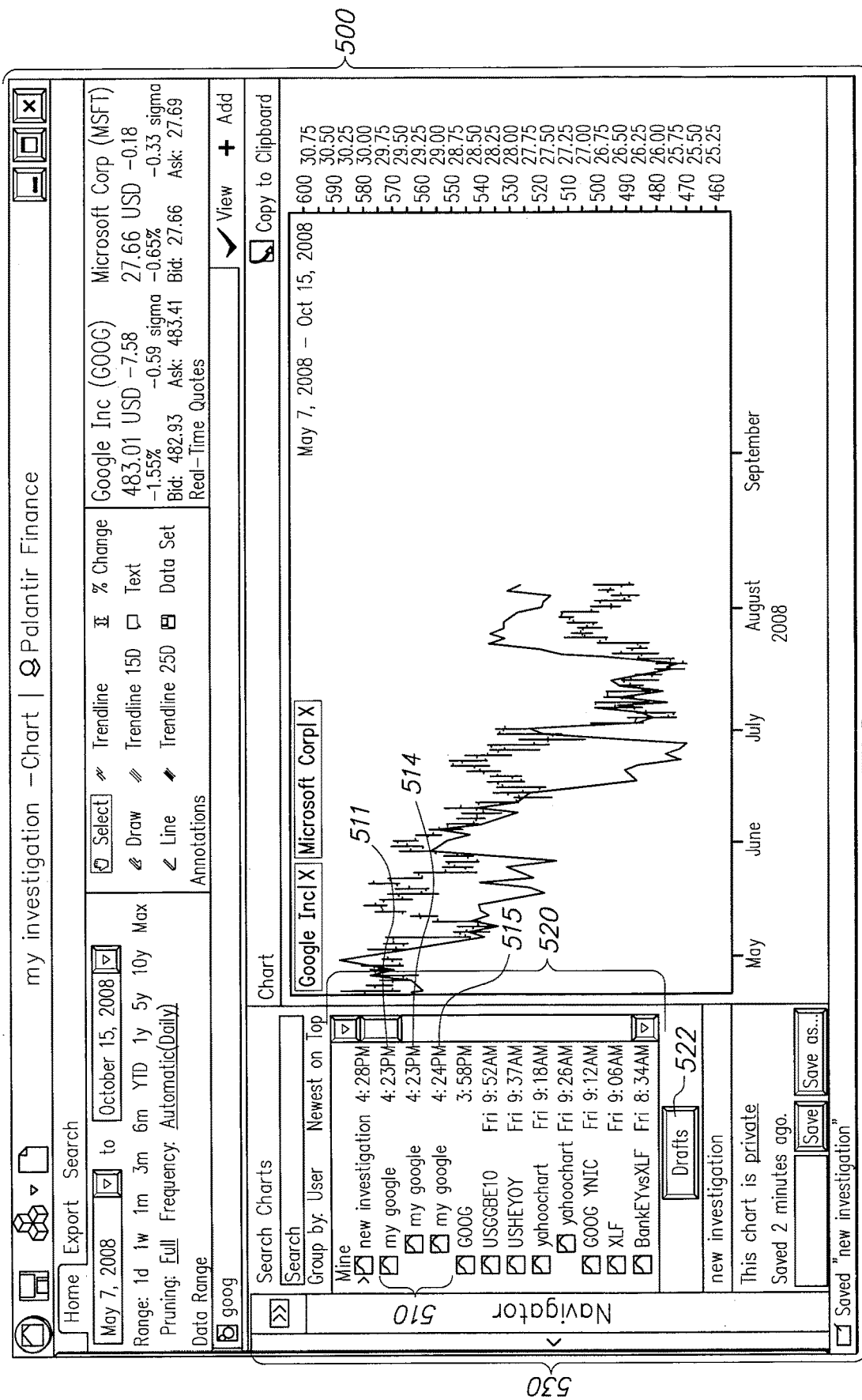
FIG. 5 illustrates an example draft listing 510 in a graphical interface 500 presented by a document authoring application.
Figure 6:
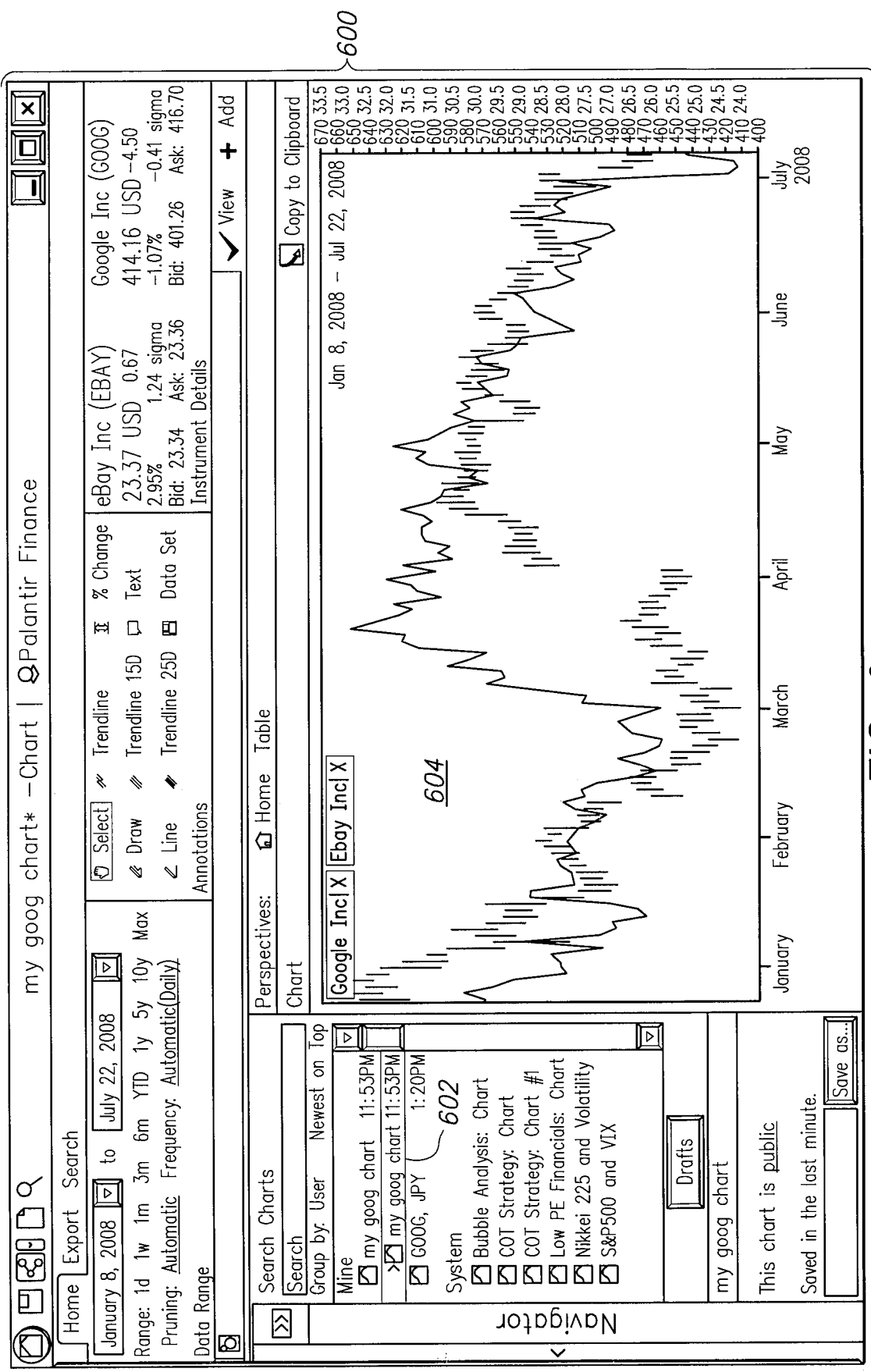
FIG. 6 illustrates an example graphical interface of a document authoring application in which a draft is selected.

FIG. 5 illustrates an example draft listing 510 in a graphical interface 500 presented by a document authoring application, according to an embodiment. FIG. 6 illustrates an example graphical interface 600 of a document authoring application in which a draft is selected. Referring first to FIG. 5, draft listing 510 is part of a document listing 520 in a sidebar 530 of the graphical interface. While draft listing 510 is depicted as a modal-less component of graphical interface 500, in that it may remain visible while a user works on his or her document in graphical interface 500, the application may present draft listing 510 to the user using a variety of other graphical interface techniques.

Document listing 520 may include a draft listing toggle button 522, which permits a user to instruct the application to show or hide draft listings for each document identifier in document listing 520.

Draft listing 510 includes an original document identifier 511, which identifies the original document as "my google." Draft listing 510 also includes draft identifiers 514-515. Each draft identifier 514-515 includes a draft name and a time at which the draft was saved. To represent the logical association between the original document and its drafts, draft identifiers 514-515 are displayed in positions that are hierarchically below the original document identifier 511. The application may also use other graphical presentation techniques to visually distinguish between drafts and the original document, such as different display intensity, different color, different character styles, etc.

When a user selects a draft identifier 514-515, the application may present to the user a draft identified by the selected draft identifier. The application may change the visual appearance of a selected draft identifier to keep the user informed of which draft he or she is viewing. For example, in FIG. 5, draft identifier 515 is highlighted to signal that the draft identified by draft identifier 515 is currently being edited within graphical interface 500. In FIG. 6, the draft identifier "my goog chart" 602 is displayed with gray highlighting to indicate that it is selected. In response to selection of a draft name, a corresponding graphical chart 604 for the selected draft is displayed in the graphical interface.

4.2. Example Interface for Server-pushed Updates to Objects

Figure 7:
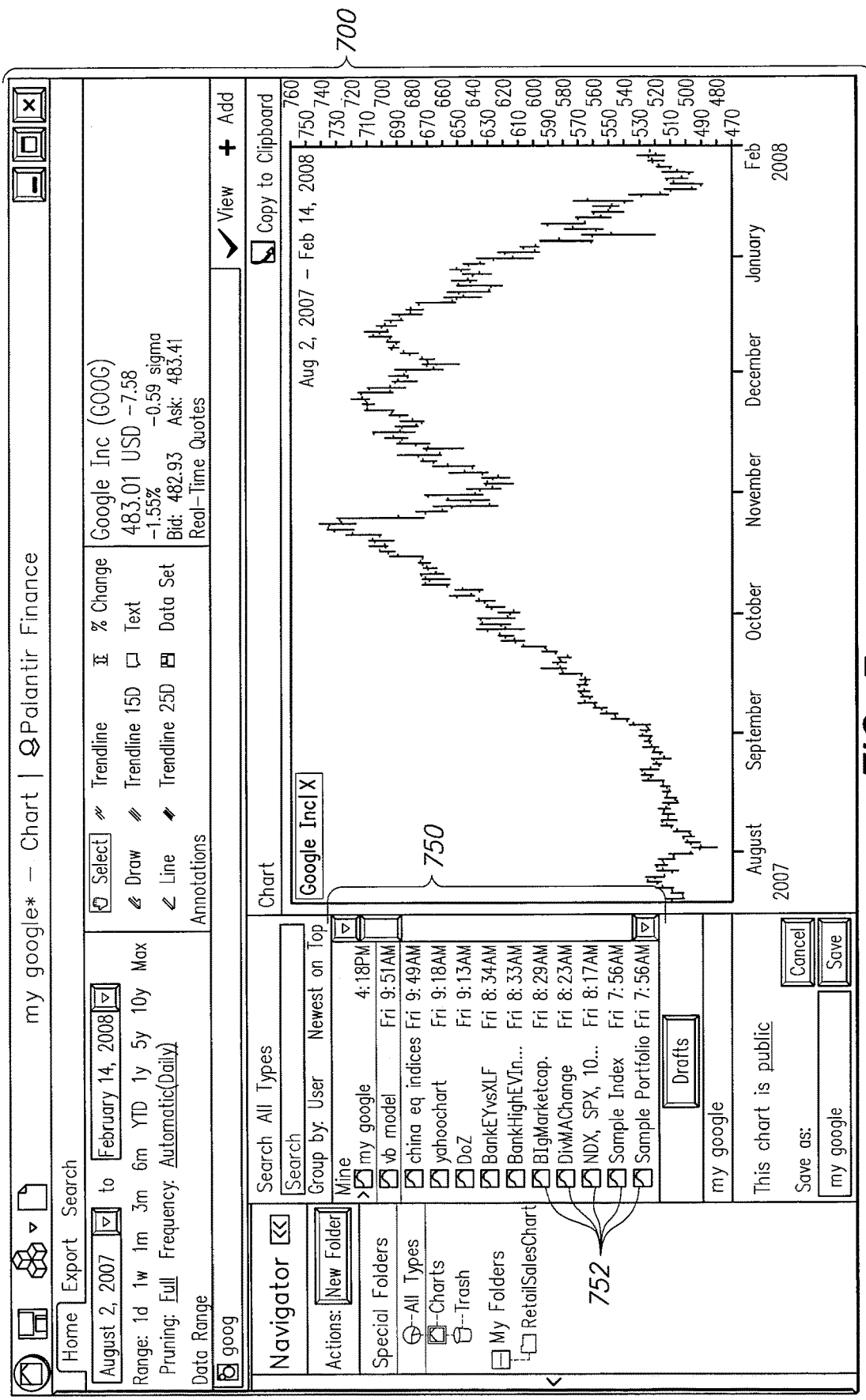
FIG. 7 illustrates an interface 700 that includes an example collaborative document listing interface 750.

FIG. 7 illustrates an interface 700 that includes an example collaborative document listing interface 750, according to an embodiment. Collaborative document listing interface 750 is a sidebar of application window 700. Collaborative document listing interface 750 lists a number of document identifiers 752 in a tree-like structure. The tree-like structure may be sortable, searchable, and/or filterable. A document corresponding to each listed document identifier 752 is stored on a server accessible to the software application.

4.3. Example Triggering Events

In some embodiments, the application may also or instead automatically save new drafts in response to events other than the closing of a document. For example, the application may save a new draft after a certain period of time has elapsed, or in response to detecting certain types or quantities of changes to the document. The application may also create a new draft each time the user saves the document. The application may also automatically save a draft in response to a sharing operation, such as the "one-click sharing" operation discussed in "One-Click Sharing for Screenshots and Related Documents."

Approaches, techniques, and mechanisms are disclosed for the efficient sharing of information between multiple users. According to an embodiment, an application provides a user with an efficient mechanism for simultaneously sharing access to documents that store information along with media, such as images, that overview or are derived from that information.

According to an embodiment, an application comprises a sharing mechanism that allows a user to 1) quickly generate an image of information from a document, 2) concurrently generate a link to the document, and 3) simultaneously paste the image with the associated link in another application. In response to a user action that implicates this sharing mechanism, the application generates an image, such as a screenshot, that depicts information from a document that has been opened in the application. The application places the image, along with an associated link to the document, in a buffer, such as a system clipboard. While in another document authoring application, such as a word-processor or email application, the user pastes the contents of the buffer into another document that has been opened in the other application. An image is therefore placed in the other document along with the associated or embedded link.

The other document is then shared with another user. The other user opens the other document in another instance of the other application. The other user views the embedded image for a quick overview of the information in the original document. If the other user requires access to the information in the original document, the other user may select or click on the embedded image. This selection causes the other application to activate the associated link. In response, the other application causes another instance of the original application to launch and open the original document for the other user.

In an embodiment, an application provides a user with functionality for cropping a screenshot prior to taking the screenshot. The application may receive initial input indicating that the user wishes to take a cropped screenshot. The application may then receive user input selecting a predefined or arbitrary region of the GUI for the screenshot. In response to the latter input, the application may generate an image of the selected region of the GUI.

According to an embodiment, an application may provide a user with functionality for annotating a screenshot prior to taking the screenshot. The application may receive initial input indicating that the user wishes to take a screenshot. The application may then receive input indicating annotations, such as graphics and text, to layer over the GUI. The application may then receive input indicating that the application should take the screenshot. In response to the latter input, the application may generate an image of the GUI with the overlaid annotations.

For convenience, various embodiments of the techniques described herein are described with respect to "screenshots." Generally, a screenshot is an image that captures the graphical content of a computer screen at a given time, encoded as data in an image-based format (e.g. a bitmap file). However, the techniques described herein are applicable to many types of media other than "screenshots," including other types of images, slideshows, presentations, and videos. Thus, unless otherwise noted, any technique or step described herein as involving a "screenshot" or an image, is likewise applicable to any media derived from or based on a document being viewed or otherwise utilized in a document authoring application.

In some embodiments, the original application may save a reference draft of the document just prior to creating the image. The link may refer to this reference draft of the document instead of the document draft that was originally opened by the user. The reference draft may be write-protected so as to ensure that the reference draft always includes the same information that was contained in the document at the time the image was generated.

In some embodiments, the application may be configured to automatically save a new draft upon the closing of a document, or in response to another event, only when a document has been changed.

4.4. Example Draft Storage Techniques

The application may utilize a variety of techniques to save new drafts. For example, the application may save a separate file for each draft. In an embodiment, the application avoids asking the user to provide a name for the file in which the application saves the draft, instead determining a unique name for the draft based on one or more of the original document's name, a time at which the document was saved or opened, a running count of drafts for the object, a running count of drafts for the application (or a server at which the application stores drafts, a user name, and a random number.

As another example, instead of creating a separate file for each draft, the application may store drafts within the original document. Drafts may comprise a full copy of the original document. Drafts may instead include only data that indicates changes between the draft and one or more previous drafts, including the original document. In an embodiment, each draft is stored in the original document in such a manner so as to indicate a chronological order for the drafts.

The application may take steps to logically associate drafts with the original document. For example, the application may store metadata associating each draft with its original document. This metadata may be stored within the drafts, within the original document, or in any other location accessible to the application. In addition or instead of storing logical association metadata, the application may name or store draft files within a file system in such a manner as to make the logical association between drafts and their original document apparent. In embodiments where drafts are included in the original document, the drafts are logically associated with the original document by virtue of their inclusion in the original document.

In an embodiment, each draft includes metadata indicating a time at which the draft was saved and/or originally opened.

4.5. User-instigated Save Operations

In some embodiments, a user may instigate a save operation on a draft by means of, for instance, a save interface. The resulting save operation may, for instance, create a new draft, overwrite the original object, or create an entirely new document based on the draft. Some embodiments may not include an explicit save interface since saves are performed implicitly. However, it may be useful to provide such an interface in other embodiments to support explicit save operations. In response to user selection of the save interface, the application may, for example, promote a draft to be a separate document. Alternatively, the application may create a new draft of the document in response to the save operation. In one embodiment, in response to the explicit save operation, the application may also purge one or more previously saved drafts.

5.0. IMPLEMENTATION MECHANISM—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
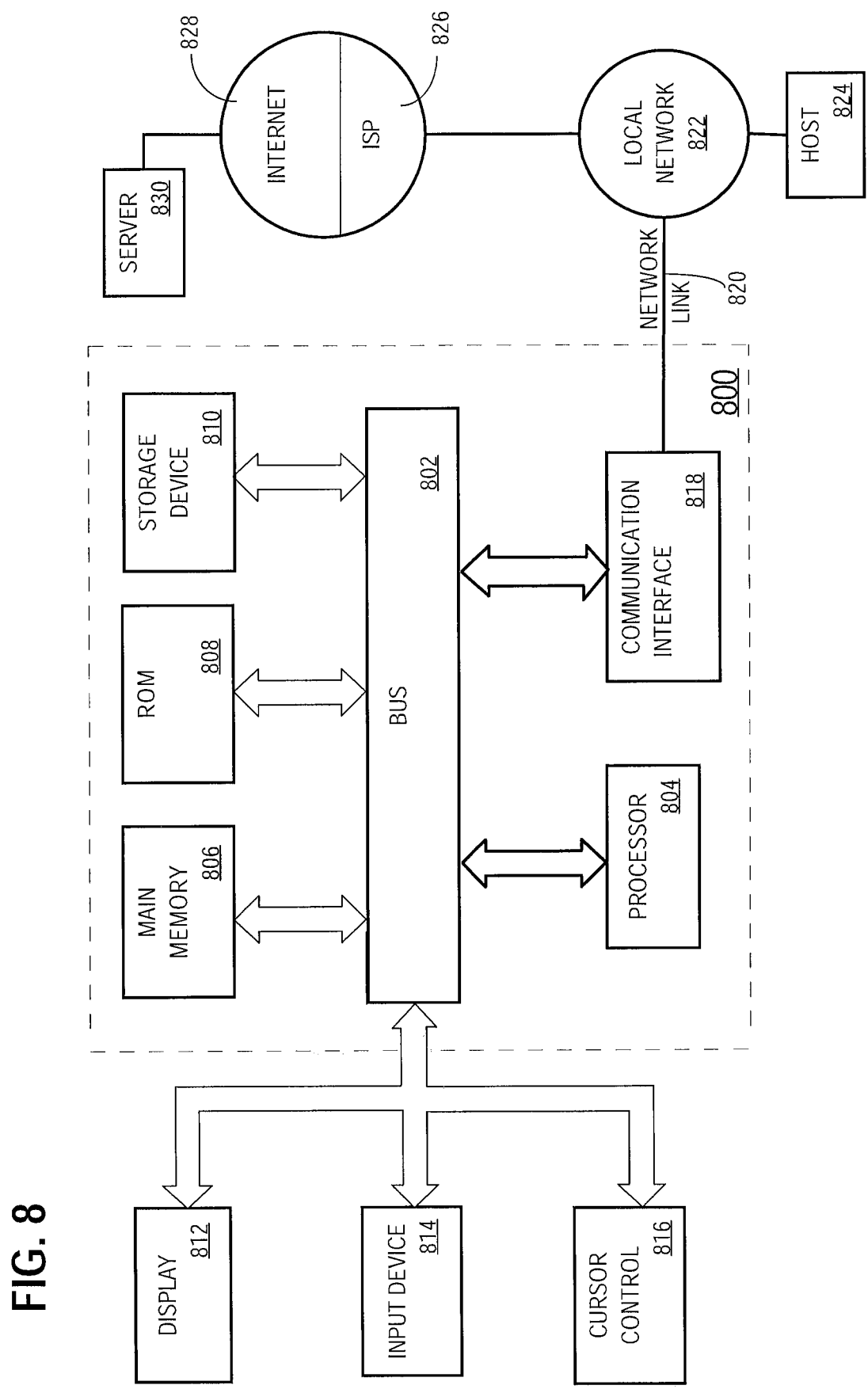
FIG. 8 is block diagram of a computer system upon which embodiments of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

6.0. EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

7.0. CONCLUSION

Using the above-described automatic draft-saving techniques, an application may greatly reduce the amount of time and effort required of a user when switching between different documents and/or tasks. At the same time, the above-described techniques allow a user, with minimal effort, to maintain and access a record of changes to a document over time.

Moreover, in providing a collaborative document listing interface that implements the above described techniques for a server pushing updated objects, an application enhances collaboration between users by simplifying the process of a user locating and opening documents created and edited by others. Furthermore, by automatically updating the document listing in the collaborative document listing interface upon additions, deletions, and changes at a server, an application reduces transaction times associated in the document sharing process.

What is claimed is:

1. A method comprising:
an application automatically creating multiple drafts of an object reflecting changes to data inside of the object, wherein each draft of the multiple drafts is a different version of the object;
receiving a first command that causes the application to close the object;
the application automatically creating a first draft of the multiple drafts, without deleting or overwriting any other draft of the multiple drafts, and without deleting or overwriting the object, in response to a change in the object and the first command;
receiving a second command that causes the application to open the object;
receiving a third command that causes generating output for the object based on the data inside of the object, wherein the third command is an input requesting to generate the output for the object based on the data inside of the object, and wherein the output is a screenshot of the object and a link to the object, and wherein the screenshot of the object and the link to the object are placed in a buffer that is shared with a plurality of applications executing at a computing device;
the application automatically creating a second draft of the multiple drafts, without deleting or overwriting any other draft of the multiple drafts, and without deleting or overwriting the object, in response to a change in the object and the third command;
the application causing each of the multiple drafts to be stored concurrently, in association with the object;
the application presenting a list of the multiple drafts;
the application receiving a selection of a particular draft from the list of the multiple drafts;
in response to receiving the selection of the particular draft, the application opening the particular draft;
wherein the application creates at least one of the multiple drafts in response to another command that causes the application to close the object;
wherein the method is performed by one or more computing devices.

2. The method of claim 1, further comprising:
receiving a command to open the object;
in response to the command, opening a most recently created draft of said multiple drafts.

3. The method of claim 1, wherein the list of the multiple drafts includes, for each draft of the multiple drafts, data indicating a time at which each draft of the multiple drafts was saved.

4. The method of claim 1, wherein the application automatically creates each draft, without user intervention.

5. The method of claim 1, wherein each of the multiple drafts is stored within the object.

6. The method of claim 1, wherein each of the multiple drafts is stored external to the object and includes an identifier for the object.

7. The method of claim 1, wherein the first command that causes the application to close the object is one of an instruction to close the object, an instruction to open another object, or an instruction to terminate the application.

8. The method of claim 1, wherein generating the output comprises generating, in association with an image derived from the data inside of the object, a link to the second draft of the object.

9. The method of claim 1, wherein generating the output comprises generating a link to the second draft of the object, wherein the second draft is a write-protected reference draft of the object.

10. The method of claim 1, wherein each draft of the multiple drafts comprises session-identifying information associating each draft of the multiple drafts with a specific application session in which each draft of the multiple drafts was created.

11. The method of claim 10, wherein the application presenting the list of the multiple drafts comprises presenting, for each draft of the multiple drafts, the session-identifying information associated with each draft of the multiple drafts.

12. A method comprising:
a first device presenting an interface comprising a list of drafts of an object stored at a location on a server, the interface configured to allow access to each draft in the list of drafts, wherein each draft in the list of drafts is a different version of the object;
concurrent to the first device presenting the interface, a second device creating a new draft of the object, without deleting or overwriting any other draft, and without deleting or overwriting the object, and storing the new draft in association with the object at the location on the server;

wherein the second device automatically creating a new draft comprises the second device automatically saving edits to the object as the new draft in response to a change in the object and input requesting to generate output for the object based on data inside of the object, wherein the output is a screenshot of the object and a link to the object, and wherein the screenshot of the object and the link to the object are placed in a buffer that is shared with a plurality of applications executing at a computing device;

while presenting the interface, without user intervention, and further without polling the server, the first device receiving from the server data indicating the availability of the new draft at the server;

in response to the data, the first device updating the list of drafts of the object to include the new draft;

wherein the application creates at least one of the drafts in response to another command that causes the application to close the object;

wherein the method is performed by one or more computing devices.

13. The method of claim 12, wherein the updated list of drafts is part of a hierarchy of objects, the hierarchy indicating that each draft in the list of drafts is associated with the existing object.

14. The method of claim 12, further comprising:
the second device presenting a second interface comprising the updated list of drafts;
concurrent to the second device presenting the second interface, the first device creating a second new draft of the object and storing the second new draft in association with the object at the location on the server;
while presenting the interface, without user intervention, and further without polling the server, the second device receiving from the server second data indicating the availability of the second new draft at the server;
in response to the second data, the second device updating the list of drafts of the object to include the second new draft.

15. The method of claim 12, wherein the new draft is a reference draft associated with the output.

16. The method of claim 12, wherein each draft in the list of drafts comprises session-specifying information associating each draft in the list of drafts with a specific application session in which each draft in the list of drafts was created.

17. The method of claim 16, wherein the first device presenting an interface comprising a list of drafts of an object stored at a location on a server comprises presenting, for each draft of the list of drafts, the session-identifying information associated with each draft in the list of drafts.

18. One or more non-transitory media storing instructions which, when executed by one or more processors, cause:
an application automatically creating multiple drafts of an object reflecting changes to data inside of the object, wherein each draft of the multiple drafts is a different version of the object;
receiving a first command that causes the application to close the object;
the application automatically creating a first draft of the multiple drafts, without deleting or overwriting any other draft of the multiple drafts, and without deleting or overwriting the object, in response to a change in the object and the first command;

receiving a second command that causes the application to open the object;
receiving a third command that causes generating output for the object based on the data inside of the object, wherein the third command is an input requesting to generate the output for the object based on the data inside of the object, and wherein the output is a screenshot of the object and a link to the object, and wherein the screenshot of the object and the link to the object are placed in a buffer that is shared with a plurality of applications executing at a computing device;
the application automatically creating a second draft of the multiple drafts, without deleting or overwriting any other draft of the multiple drafts, and without deleting or overwriting the object, in response to a change in the object and the third command;
the application causing each of the multiple drafts to be stored concurrently, in association with the object;
the application presenting a list of the multiple drafts;
the application receiving a selection of a particular draft from the list of the multiple drafts;
in response to receiving the selection of the particular draft, the application opening the particular draft;
wherein the application creates at least one of the multiple drafts in response to another command that causes the application to close the object.

19. The one or more non-transitory media of claim 18, wherein the instructions, when executed by the one or more processors, further cause:
receiving a command to open the object;
in response to the command, opening a most recently created draft of said multiple drafts.

20. The one or more non-transitory media of claim 18, wherein the list of the multiple drafts includes, for each draft of the multiple drafts, data indicating a time at which each draft of the multiple drafts was saved.

21. The one or more non-transitory media of claim 18, wherein the application automatically creates each draft, without user intervention.

22. The one or more non-transitory media of claim 18, wherein each of the multiple drafts is stored within the object.

23. The one or more non-transitory media of claim 18, wherein each of the multiple drafts is stored external to the object and includes an identifier for the object.

24. The one or more non-transitory media of claim 18, wherein the first command that causes the application to close the object is one of an instruction to close the object, an instruction to open another object, or an instruction to terminate the application.

25. The one or more non-transitory media of claim 18, wherein generating the output comprises generating, in association with an image derived from the data inside of the object, a link to the second draft of the object.

26. The one or more non-transitory media of claim 18, wherein generating the output comprises generating a link to the second draft of the object, wherein the second draft is a write-protected reference draft of the object.

27. One or more non-transitory media storing instructions which, when executed by one or more processors, cause:
a first device presenting an interface comprising a list of drafts of an object stored at a location on a server, the interface configured to allow access to each draft in the list of drafts, wherein each draft in the list of drafts is a different version of the object;

concurrent to the first device presenting the interface, a second device creating a new draft of the object, without deleting or overwriting any other draft, and without deleting or overwriting the object, and storing the new draft in association with the object at the location on the server;

wherein the second device automatically creating a new draft comprises the second device automatically saving edits to the object as the new draft in response to a change in the object and input requesting to generate output for the object based on data inside of the object, wherein the output is a screenshot of the object and a link to the object, and wherein the screenshot of the object and the link to the object are placed in a buffer that is shared with a plurality of applications executing at a computing device;

while presenting the interface, without user intervention, and further without polling the server, the first device receiving from the server data indicating the availability of the new draft at the server;

in response to the data, the first device updating the list of drafts of the object to include the new draft;

wherein the application creates at least one of the drafts in response to another command that causes the application to close the object.

28. The one or more non-transitory media of claim 27, wherein the updated list of drafts is part of a hierarchy of objects, the hierarchy indicating that each draft in the list of drafts is associated with the existing object.

29. The one or more non-transitory media of claim 27, wherein the instructions, when executed by the one or more processors, further cause:

the second device presenting a second interface comprising the updated list of drafts;

concurrent to the second device presenting the second interface, the first device creating a second new draft of the object and storing the second new draft in association with the object at the location on the server;

while presenting the interface, without user intervention, and further without polling the server, the second device receiving from the server second data indicating the availability of the second new draft at the server;

in response to the second data, the second device updating the list of drafts of the object to include the second new draft.

30. The one or more non-transitory media of claim 27, wherein the new draft is a reference draft associated with the output.

* * * * *